(12) United States Patent
Forbes, Jr. et al.

(10) Patent No.: US 8,527,107 B2
(45) Date of Patent: Sep. 3, 2013

(54) METHOD AND APPARATUS FOR EFFECTING CONTROLLED RESTART OF ELECTRICAL SERVCIE WITH A UTILITY SERVICE AREA

(75) Inventors: Joseph W. Forbes, Jr., Wake Forest, NC (US); Joel L. Webb, Oklahoma City, OK (US)

(73) Assignee: Consert Inc., San Antonio, TX (US)

( * ) Notice: Subject to any disclaimer, the term of this patent is extended or adjusted under 35 U.S.C. 154(b) by 574 days.

(21) Appl. No.: 12/896,307

(22) Filed: Oct. 1, 2010

(65) Prior Publication Data

US 2011/0022239 A1 Jan. 27, 2011

Related U.S. Application Data

(60) Continuation-in-part of application No. 12/715,124, filed on Mar. 1, 2010, now Pat. No. 8,010,812, which is a division of application No. 11/895,909, filed on Aug. 28, 2007, now Pat. No. 7,715,951, application No. 12/896,307, which is a continuation-in-part of application No. 12/715,195, filed on Mar. 1, 2010, now Pat. No. 8,032,233, which is a division of application No. 11/895,909, application No. 12/896,307, which is a continuation-in-part of application No. 12/702,640, filed on Feb. 9, 2010, now Pat. No. 8,131,403, which is a continuation-in-part of application No. 11/895,909.

(60) Provisional application No. 61/150,978, filed on Feb. 9, 2009, provisional application No. 61/176,752, filed on May 8, 2009, provisional application No. 61/279,072, filed on Oct. 15, 2009.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G05F 5/00* | (2006.01) |
| *G05F 3/00* | (2006.01) |
| *G05F 3/02* | (2006.01) |

(52) U.S. Cl.
USPC ........... 700/295; 700/291; 700/293; 700/294; 700/297; 323/299; 323/304; 323/318

(58) Field of Classification Search
USPC .................. 700/22, 286, 291–298; 323/299, 323/304, 318
See application file for complete search history.

(56) References Cited

U.S. PATENT DOCUMENTS

| 3,906,242 A | 9/1975 | Stevenson |
| 4,023,043 A | 5/1977 | Stevenson |

(Continued)

FOREIGN PATENT DOCUMENTS

| EP | 1 729 223 A2 | 12/2006 |
| JP | 2000078748 A | 3/2000 |

(Continued)

OTHER PUBLICATIONS

International Search Report and Written Opinion dated Oct. 30, 2012 issued by the Korean Intellectual Property Office as International Searching Authority in connection with related International Application No. PCT/US2012/029339 (13 pages).

(Continued)

*Primary Examiner* — Ramesh Patel
(74) *Attorney, Agent, or Firm* — Daniel C. Crilly; GrayRobinson, P.A.

(57) ABSTRACT

An active load management system (ALMS) controllably restarts electrical service to service points in a utility service area after a power outage. The ALMS includes client devices installed at the service points and a central controller. In one embodiment, the controller associates numbers with the service points and stores the associations. Each service point may be associated with a unique number or a group of service points may share a number. After receiving notification that power is available, the controller determines a number and communicates the number to one or more of the client devices. Where the number was determined randomly, the client devices associated with the number may restart electrical service upon receipt of the number. Where the number was determined sequentially, a client device may determine its own random number and compare it to the received number. If a match occurs, electrical service can be restarted.

31 Claims, 10 Drawing Sheets

(56) References Cited

U.S. PATENT DOCUMENTS

| | | | |
|---|---|---|---|
| 4,077,061 A * | 2/1978 | Johnston et al. | ............... 702/58 |
| 4,589,075 A | 5/1986 | Buennagel | |
| 4,799,059 A | 1/1989 | Grindahl et al. | |
| 4,819,180 A | 4/1989 | Hedman et al. | |
| 4,819,229 A * | 4/1989 | Pritty et al. | ............... 370/455 |
| 5,237,507 A | 8/1993 | Chasek | |
| 5,361,982 A | 11/1994 | Liebl et al. | |
| 5,388,101 A | 2/1995 | Dinkins | |
| 5,481,546 A | 1/1996 | Dinkins | |
| 5,495,239 A | 2/1996 | Ouellette | |
| 5,502,339 A | 3/1996 | Hartig | |
| 5,544,036 A | 8/1996 | Brown, Jr. et al. | |
| 5,553,094 A | 9/1996 | Johnson et al. | |
| 5,570,002 A | 10/1996 | Castleman | |
| 5,592,491 A | 1/1997 | Dinkins | |
| 5,640,153 A | 6/1997 | Hildebrand et al. | |
| 5,644,173 A | 7/1997 | Elliason et al. | |
| 5,675,503 A | 10/1997 | Moe et al. | |
| 5,682,422 A | 10/1997 | Oliver | |
| 5,696,695 A | 12/1997 | Ehlers et al. | |
| 5,721,936 A | 2/1998 | Kikinis et al. | |
| 5,748,104 A | 5/1998 | Argyroudis et al. | |
| 5,926,776 A | 7/1999 | Glorioso et al. | |
| 6,018,690 A | 1/2000 | Saito et al. | |
| 6,047,274 A | 4/2000 | Johnson et al. | |
| 6,078,785 A * | 6/2000 | Bush | ............... 455/7 |
| 6,102,487 A | 8/2000 | Ovrebo | |
| 6,115,676 A | 9/2000 | Rector et al. | |
| 6,122,603 A | 9/2000 | Budike, Jr. | |
| 6,154,859 A | 11/2000 | Norizuki et al. | |
| 6,178,362 B1 * | 1/2001 | Woolard et al. | ............... 700/295 |
| 6,185,483 B1 | 2/2001 | Drees | |
| 6,216,956 B1 | 4/2001 | Ehlers et al. | |
| 6,233,327 B1 | 5/2001 | Petite | |
| 6,254,009 B1 | 7/2001 | Proffitt et al. | |
| 6,304,552 B1 | 10/2001 | Chapman et al. | |
| 6,374,101 B1 | 4/2002 | Gelbien | |
| 6,437,692 B1 | 8/2002 | Petite et al. | |
| 6,519,509 B1 | 2/2003 | Nierlich et al. | |
| 6,535,797 B1 | 3/2003 | Bowles et al. | |
| 6,577,962 B1 | 6/2003 | Afshari | |
| 6,601,033 B1 | 7/2003 | Sowinski | |
| 6,621,179 B1 | 9/2003 | Howard | |
| 6,622,097 B2 | 9/2003 | Hunter | |
| 6,622,925 B2 | 9/2003 | Carner et al. | |
| 6,628,113 B2 | 9/2003 | Gallavan | |
| 6,633,823 B2 | 10/2003 | Bartone et al. | |
| 6,671,586 B2 | 12/2003 | Davis et al. | |
| 6,681,154 B2 | 1/2004 | Nierlich et al. | |
| 6,687,574 B2 | 2/2004 | Pietrowicz et al. | |
| 6,732,055 B2 | 5/2004 | Bagepalli et al. | |
| 6,763,250 B1 | 7/2004 | Forbes, Jr. | |
| 6,778,882 B2 | 8/2004 | Spool et al. | |
| 6,784,807 B2 | 8/2004 | Petite et al. | |
| 6,785,592 B1 * | 8/2004 | Smith et al. | ............... 700/291 |
| 6,832,135 B2 | 12/2004 | Ying | |
| 6,834,811 B1 | 12/2004 | Huberman et al. | |
| 6,836,737 B2 | 12/2004 | Petite et al. | |
| 6,862,498 B2 | 3/2005 | Davis et al. | |
| 6,865,450 B2 | 3/2005 | Masticola et al. | |
| 6,868,293 B1 | 3/2005 | Schurr et al. | |
| 6,879,059 B2 | 4/2005 | Sleva | |
| 6,882,498 B2 | 4/2005 | Kurumatani et al. | |
| 6,891,838 B1 | 5/2005 | Petite et al. | |
| 6,904,336 B2 | 6/2005 | Raines et al. | |
| 6,906,617 B1 | 6/2005 | Van der Meulen | |
| 6,909,942 B2 | 6/2005 | Andarawis et al. | |
| 6,914,533 B2 | 7/2005 | Petite | |
| 6,914,553 B1 | 7/2005 | Petite | |
| 6,914,893 B2 | 7/2005 | Petite | |
| 6,934,316 B2 | 8/2005 | Cornwall et al. | |
| 6,961,641 B1 | 11/2005 | Forth et al. | |
| 6,990,593 B2 | 1/2006 | Nakagawa | |
| 7,003,640 B2 | 2/2006 | Mayo et al. | |
| 7,019,667 B2 | 3/2006 | Petite et al. | |
| 7,035,719 B2 | 4/2006 | Howard et al. | |
| 7,039,532 B2 | 5/2006 | Hunter | |
| 7,051,332 B2 * | 5/2006 | Gatto et al. | ............... 718/108 |
| 7,053,767 B2 | 5/2006 | Petite et al. | |
| 7,088,014 B2 | 8/2006 | Nierlich et al. | |
| 7,089,125 B2 | 8/2006 | Sonderegger | |
| 7,103,511 B2 | 9/2006 | Petite | |
| 7,123,994 B2 | 10/2006 | Weik et al. | |
| 7,130,719 B2 | 10/2006 | Ehlers et al. | |
| 7,133,750 B2 | 11/2006 | Raines et al. | |
| 7,177,728 B2 | 2/2007 | Gardner | |
| 7,181,320 B2 | 2/2007 | Whiffen et al. | |
| 7,184,861 B2 | 2/2007 | Petite | |
| 7,200,134 B2 | 4/2007 | Proctor, Jr. et al. | |
| 7,206,670 B2 | 4/2007 | Pimputkar et al. | |
| 7,209,804 B2 | 4/2007 | Curt et al. | |
| 7,209,840 B2 | 4/2007 | Petite et al. | |
| 7,231,280 B2 | 6/2007 | Costa | |
| 7,231,281 B2 | 6/2007 | Costa | |
| 7,233,843 B2 | 6/2007 | Budhraja et al. | |
| 7,263,073 B2 | 8/2007 | Petite et al. | |
| 7,274,975 B2 | 9/2007 | Miller | |
| 7,289,887 B2 | 10/2007 | Rodgers | |
| 7,295,128 B2 | 11/2007 | Petite | |
| 7,305,282 B2 | 12/2007 | Chen | |
| 7,313,465 B1 | 12/2007 | O'Donnell | |
| 7,333,880 B2 | 2/2008 | Brewster et al. | |
| 7,343,341 B2 | 3/2008 | Sandor et al. | |
| 7,345,998 B2 | 3/2008 | Cregg et al. | |
| 7,346,463 B2 | 3/2008 | Petite et al. | |
| 7,366,164 B1 | 4/2008 | Habib et al. | |
| 7,397,907 B2 | 7/2008 | Petite | |
| 7,406,364 B2 | 7/2008 | Andrén et al. | |
| 7,412,304 B2 | 8/2008 | Uenou | |
| 7,424,527 B2 | 9/2008 | Petite | |
| 7,440,871 B2 | 10/2008 | McConnell et al. | |
| 7,451,019 B2 * | 11/2008 | Rodgers | ............... 700/295 |
| 7,468,661 B2 | 12/2008 | Petite et al. | |
| 7,480,501 B2 | 1/2009 | Petite | |
| 7,486,681 B2 | 2/2009 | Weber | |
| 7,528,503 B2 | 5/2009 | Rognli et al. | |
| 7,536,240 B2 | 5/2009 | McIntyre et al. | |
| 7,541,941 B2 | 6/2009 | Bogolea et al. | |
| 7,565,227 B2 | 7/2009 | Richard et al. | |
| 7,650,425 B2 | 1/2010 | Davis et al. | |
| 7,697,492 B2 | 4/2010 | Petite | |
| 7,711,796 B2 | 5/2010 | Gutt et al. | |
| 7,715,951 B2 | 5/2010 | Forbes, Jr. et al. | |
| 7,738,999 B2 | 6/2010 | Petite | |
| 7,739,378 B2 | 6/2010 | Petite | |
| 8,010,812 B2 | 8/2011 | Forbes, Jr. et al. | |
| 8,032,233 B2 | 10/2011 | Forbes, Jr. et al. | |
| 8,131,403 B2 | 3/2012 | Forbes, Jr. et al. | |
| 8,145,361 B2 | 3/2012 | Forbes, Jr. et al. | |
| 8,260,470 B2 | 9/2012 | Forbes, Jr. et al. | |
| 8,307,225 B2 | 11/2012 | Forbes, Jr. et al. | |
| 8,315,717 B2 | 11/2012 | Forbes, Jr. et al. | |
| 8,390,221 B2 * | 3/2013 | Jayanth et al. | ............... 318/376 |
| 2001/0025209 A1 | 9/2001 | Fukui et al. | |
| 2001/0030468 A1 | 10/2001 | Anderson et al. | |
| 2001/0038343 A1 | 11/2001 | Meyer et al. | |
| 2002/0019802 A1 | 2/2002 | Malme et al. | |
| 2002/0035496 A1 | 3/2002 | Fukushima et al. | |
| 2002/0109607 A1 | 8/2002 | Cumeralto et al. | |
| 2002/0138176 A1 | 9/2002 | Davis et al. | |
| 2002/0143693 A1 | 10/2002 | Soestbergen et al. | |
| 2003/0009705 A1 | 1/2003 | Thelander et al. | |
| 2003/0036820 A1 | 2/2003 | Yellepeddy et al. | |
| 2003/0040844 A1 | 2/2003 | Spool et al. | |
| 2003/0063723 A1 | 4/2003 | Booth et al. | |
| 2003/0074304 A1 | 4/2003 | Okada | |
| 2003/0083980 A1 | 5/2003 | Satake | |
| 2003/0144864 A1 | 7/2003 | Mazzarella | |
| 2003/0225483 A1 | 12/2003 | Santinato et al. | |
| 2003/0229572 A1 | 12/2003 | Raines et al. | |
| 2003/0233201 A1 | 12/2003 | Horst et al. | |
| 2004/0006439 A1 | 1/2004 | Hunter | |
| 2004/0088083 A1 * | 5/2004 | Davis et al. | ............... 700/295 |
| 2004/0095237 A1 | 5/2004 | Chen et al. | |

| Publication No. | Date | Inventor |
|---|---|---|
| 2004/0117330 A1* | 6/2004 | Ehlers et al. .................. 705/412 |
| 2004/0128266 A1 | 7/2004 | Yellepeddy et al. |
| 2004/0153170 A1 | 8/2004 | Santacatterina et al. |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2004/0230533 A1 | 11/2004 | Benco |
| 2005/0033481 A1 | 2/2005 | Budhraja et al. |
| 2005/0055432 A1 | 3/2005 | Rodgers |
| 2005/0065742 A1 | 3/2005 | Rodgers |
| 2005/0096856 A1 | 5/2005 | Lubkeman et al. |
| 2005/0096857 A1 | 5/2005 | Hunter |
| 2005/0116836 A1 | 6/2005 | Perry et al. |
| 2005/0125243 A1 | 6/2005 | Villalobos |
| 2005/0138432 A1 | 6/2005 | Ransom et al. |
| 2005/0192711 A1 | 9/2005 | Raines et al. |
| 2005/0192713 A1 | 9/2005 | Weik et al. |
| 2005/0216302 A1 | 9/2005 | Raji et al. |
| 2005/0216580 A1 | 9/2005 | Raji et al. |
| 2005/0234600 A1 | 10/2005 | Boucher et al. |
| 2005/0240314 A1 | 10/2005 | Martinez |
| 2005/0240315 A1* | 10/2005 | Booth et al. .................. 700/295 |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2006/0020544 A1 | 1/2006 | Kaveski |
| 2006/0022841 A1 | 2/2006 | Hoiness et al. |
| 2006/0025891 A1 | 2/2006 | Budike, Jr. |
| 2006/0031934 A1 | 2/2006 | Kriegel |
| 2006/0064205 A1 | 3/2006 | Ying |
| 2006/0106635 A1 | 5/2006 | Ulrich et al. |
| 2006/0142900 A1 | 6/2006 | Rothman et al. |
| 2006/0142961 A1 | 6/2006 | Johnson et al. |
| 2006/0161450 A1 | 7/2006 | Carey et al. |
| 2006/0168191 A1 | 7/2006 | Ives |
| 2006/0195334 A1 | 8/2006 | Reeb et al. |
| 2006/0259199 A1 | 11/2006 | Gjerde et al. |
| 2006/0271244 A1 | 11/2006 | Cumming et al. |
| 2006/0271314 A1 | 11/2006 | Hayes |
| 2007/0021874 A1 | 1/2007 | Rognli et al. |
| 2007/0025249 A1 | 2/2007 | Yeom |
| 2007/0058453 A1 | 3/2007 | Shaffer et al. |
| 2007/0058629 A1 | 3/2007 | Luft |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1 | 5/2007 | Balan et al. |
| 2007/0203722 A1 | 8/2007 | Richards et al. |
| 2007/0204176 A1 | 8/2007 | Shaffer et al. |
| 2007/0205915 A1 | 9/2007 | Shuey et al. |
| 2007/0213878 A1 | 9/2007 | Chen |
| 2007/0255457 A1 | 11/2007 | Whitcomb et al. |
| 2007/0286210 A1 | 12/2007 | Gutt et al. |
| 2007/0291644 A1 | 12/2007 | Roberts et al. |
| 2007/0299562 A1 | 12/2007 | Kates |
| 2008/0015975 A1 | 1/2008 | Ivchenko et al. |
| 2008/0015976 A1 | 1/2008 | Sandor et al. |
| 2008/0091625 A1 | 4/2008 | Kremen |
| 2008/0130673 A1 | 6/2008 | Cregg et al. |
| 2008/0147465 A1 | 6/2008 | Raines et al. |
| 2008/0165714 A1 | 7/2008 | Dettinger et al. |
| 2008/0172312 A1 | 7/2008 | Synesiou et al. |
| 2008/0177423 A1 | 7/2008 | Brickfield et al. |
| 2008/0177678 A1 | 7/2008 | Di Martini et al. |
| 2008/0183523 A1 | 7/2008 | Dikeman |
| 2008/0201255 A1 | 8/2008 | Green |
| 2008/0224892 A1 | 9/2008 | Bogolea et al. |
| 2008/0228630 A1 | 9/2008 | Gotthelf et al. |
| 2008/0231114 A1 | 9/2008 | Tolnar et al. |
| 2008/0238710 A1 | 10/2008 | Tolnar et al. |
| 2008/0255899 A1 | 10/2008 | McConnell et al. |
| 2008/0275815 A1 | 11/2008 | Musier et al. |
| 2008/0281473 A1 | 11/2008 | Pitt |
| 2009/0018884 A1 | 1/2009 | McConnell et al. |
| 2009/0043519 A1 | 2/2009 | Bridges et al. |
| 2009/0043520 A1 | 2/2009 | Pollack et al. |
| 2009/0055031 A1 | 2/2009 | Slota et al. |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. |
| 2009/0088991 A1 | 4/2009 | Brzezowski et al. |
| 2009/0106571 A1 | 4/2009 | Low et al. |
| 2009/0112758 A1 | 4/2009 | Herzig |
| 2009/0135836 A1 | 5/2009 | Veillette |
| 2009/0157510 A1 | 6/2009 | Pridmore et al. |
| 2009/0171975 A1 | 7/2009 | McConnell et al. |
| 2009/0177505 A1 | 7/2009 | Dietrich et al. |
| 2009/0184689 A1 | 7/2009 | Kressner et al. |
| 2009/0187499 A1 | 7/2009 | Mulder et al. |
| 2009/0192894 A1 | 7/2009 | Dikeman |
| 2009/0210295 A1 | 8/2009 | Edholm et al. |
| 2009/0228320 A1 | 9/2009 | Lopez et al. |
| 2009/0228406 A1 | 9/2009 | Lopez et al. |
| 2009/0240381 A1 | 9/2009 | Lane |
| 2009/0265568 A1 | 10/2009 | Jackson |
| 2009/0313033 A1 | 12/2009 | Hafner et al. |
| 2009/0319091 A1* | 12/2009 | Flohr .................. 700/295 |
| 2010/0023376 A1 | 1/2010 | Brown |
| 2010/0042420 A1 | 2/2010 | Hutchinson |
| 2010/0063832 A1 | 3/2010 | Brown |
| 2010/0076825 A1 | 3/2010 | Sato et al. |
| 2010/0106575 A1 | 4/2010 | Bixby et al. |
| 2010/0145534 A1 | 6/2010 | Forbes, Jr. et al. |
| 2010/0161148 A1 | 6/2010 | Forbes, Jr. et al. |
| 2010/0179670 A1 | 7/2010 | Forbes, Jr. et al. |
| 2010/0191862 A1 | 7/2010 | Forbes, Jr. et al. |
| 2010/0198713 A1 | 8/2010 | Forbes, Jr. et al. |
| 2010/0218010 A1 | 8/2010 | Musti et al. |
| 2010/0222935 A1 | 9/2010 | Forbes, Jr. et al. |
| 2010/0228601 A1 | 9/2010 | Vaswani et al. |
| 2010/0228861 A1 | 9/2010 | Arsovski et al. |
| 2010/0235008 A1 | 9/2010 | Forbes, Jr. et al. |
| 2010/0254290 A1 | 10/2010 | Gong et al. |
| 2011/0029655 A1 | 2/2011 | Forbes, Jr. et al. |
| 2011/0061014 A1 | 3/2011 | Frader-Thompson et al. |
| 2011/0063126 A1 | 3/2011 | Kennedy et al. |
| 2011/0082598 A1 | 4/2011 | Boretto et al. |
| 2011/0115302 A1 | 5/2011 | Slota et al. |
| 2011/0125422 A1 | 5/2011 | Goncalves Jota et al. |
| 2011/0133655 A1 | 6/2011 | Recker et al. |
| 2011/0144819 A1 | 6/2011 | Andrews et al. |
| 2011/0172837 A1 | 7/2011 | Forbes, Jr. |
| 2011/0172841 A1 | 7/2011 | Forbes, Jr. |
| 2011/0231320 A1 | 9/2011 | Irving |
| 2011/0251730 A1 | 10/2011 | Pitt |
| 2011/0251807 A1 | 10/2011 | Rada et al. |
| 2011/0257809 A1 | 10/2011 | Forbes, Jr. et al. |
| 2011/0258022 A1 | 10/2011 | Forbes, Jr. et al. |
| 2013/0120881 A1* | 5/2013 | Jayanth et al. .................. 361/24 |

FOREIGN PATENT DOCUMENTS

| | | |
|---|---|---|
| JP | 2001008380 A | 1/2001 |
| JP | 2001306839 | 11/2001 |
| JP | 2002133568 A | 5/2002 |
| JP | 2002176729 A | 6/2002 |
| JP | 2002281666 A | 9/2002 |
| JP | 2003067457 A | 3/2003 |
| JP | 2004248174 A | 2/2004 |
| JP | 2004112868 A | 4/2004 |
| JP | 2004180412 A | 6/2004 |
| JP | 2004301505 A | 10/2004 |
| JP | 2006060911 A | 3/2006 |
| JP | 2006277597 A | 10/2006 |
| JP | 2007132553 A | 5/2007 |
| JP | 2010081722 A | 4/2010 |
| JP | 2010119269 A | 5/2010 |
| JP | 2010183760 A | 8/2010 |
| KR | 2005001584 A | 1/2005 |
| KR | 20050045272 A | 5/2005 |
| KR | 20060036171 A | 4/2006 |
| KR | 100701298 B1 | 3/2007 |
| KR | 20070098172 A | 10/2007 |
| KR | 20080112692 A | 12/2008 |
| WO | 2005029243 A2 | 3/2005 |
| WO | 2007136456 A2 | 11/2007 |
| WO | WO 2008/125696 A2 | 10/2008 |
| WO | 2009032161 A2 | 3/2009 |
| WO | 2009032162 A2 | 3/2009 |

| | | | |
|---|---|---|---|
| WO | 2010129059 A1 | 11/2010 | |
| WO | 2010129958 A2 | 11/2010 | |
| WO | 2010132456 A2 | 11/2010 | |
| WO | 2010132469 A2 | 11/2010 | |
| WO | 2010132477 A2 | 11/2010 | |
| WO | 2010134987 A1 | 11/2010 | |
| WO | 2011043818 A2 | 4/2011 | |
| WO | 2011046589 A1 | 4/2011 | |
| WO | 2012106431 A1 | 8/2012 | |
| WO | 2012145102 A2 | 10/2012 | |

OTHER PUBLICATIONS

Korean Intellectual Property Office, Second Notification of Provisional Rejection dated Oct. 31, 2012, as entered in related Korean Application No. 10-2010-7006801 (5 pages).

The Patent Office of the People'S Republic of China; Notification of the Second Office Action dated Oct. 29, 2012, as entered in related Chinese Application No. 200880113530.X (9 pages).

Mexican Institute of Industrial Property, Official Action dated Nov. 9, 2012, as entered in related Mexican Application No. MX/a/2011/011824 (2 pages).

Korean Intellectual Property Office, Notification of Provisional Rejection dated Nov. 23, 2012, as entered in related Korean Application No. 10-2011-7029409 (3 pages).

The Patent Office of the People'S Republic of China; Notification of the Second Office Action dated Oct. 26, 2012, as entered in related Chinese Application No. 200880113529.7 (7 pages).

Korean Intellectual Property Office, Second Notification of Provisional Rejection dated Oct. 22, 2012, as entered in related Korean Application No. 10-2012-7001804 (1 page).

Korean Intellectual Property Office, Notification of Provisional Rejection dated Dec. 14, 2012, as entered in related Korean Application No. 10-2011-7030546 (2 pages).

U.S. Patent and Trademark Office; Final Office Action dated Jan. 4, 2013, as entered in related U.S. Appl. No. 12/783,415 (39 pages).

The Patent Office of the People's Republic of China; Notification of the First Office Action dated Oct. 17, 2011, as entered in related Chinese Application No. 200880113530.X (9 pages).

The Patent Office of the People's Republic of China; Notification of the First Office Action dated Oct. 17, 2011, as entered in related Chinese Application No. 200880113529.7 (11 pages).

U.S. Patent and Trademark Office; Office Action dated Dec. 15, 2011, as entered in related U.S. Appl. No. 13/172,261 (8 pages).

U.S. Patent and Trademark Office; Office Action dated Feb. 6, 2012, as entered in related U.S. Appl. No. 13/172,389 (9 pages).

U.S. Patent and Trademark Office; Office Action dated Jan. 3, 2012, as entered in related U.S. Appl. No. 12/702,768 (9 pages).

U.S. Patent and Trademark Office; Notice of Allowability dated Jan. 25, 2012, as entered in related U.S. Appl. No. 12/702,640 (11 pages).

U.S. Patent and Trademark Office; Notice of Allowability dated Feb. 10, 2012, as entered in related U.S. Appl. No. 12/702,785 (10 pages).

U.S. Patent and Trademark Office; Office Action dated Mar. 9, 2012, as entered in related U.S. Appl. No. 12/783,415 (36 pages).

International Search Report and Written Opinion dated Dec. 20, 2010 issued by the United States Patent and Trademark Office as International Searching Authority in connection with related International Application No. PCT/US10/02676 (20 pages).

International Search Report and Written Opinion dated Nov. 30, 2010 issued by the Korean Intellectual Property Office as International Searching Authority in connection with related International Application No. PCT/US2010/034395 (8 pages).

International Search Report and Written Opinion dated Dec. 21, 2010 issued by the Korean Intellectual Property Office as International Searching Authority in connection with related International Application No. PCT/US2010/034247 (7 pages).

International Search Report and Written Opinion dated Dec. 22, 2010 issued by the Korean Intellectual Property Office as International Searching Authority in connection with related International Application No. PCT/US2010/034409 (7 pages).

International Search Report and Written Opinion dated Dec. 22, 2010 issued by the Korean Intellectual Property Office as International Searching Authority in connection with related International Application No. PCT/US2010/034418 (7 pages).

Office Action dated Jan. 7, 2011 from the Australian Patent Office (Australian Government IP Australia) in connection with related Australian Application No. 2008296979 (2 pages).

Mashiro Inoue, Toshiyasu Higuma, Yoshiaki Ito, Noriyuki Kushiro and Hitoshi Kubota, Network Architecture for Home Energy Management System, IEEE Transactions on Consumer Electronics, vol. 49, Issue 3, Aug. 2003, pp. 606-613 (8 pages).

Paul Darbee, INSTEON The Details, Smarthouse, Inc., Aug. 11, 2005, 68 pages.

Paul Darbee, INSTEON Compared, SmartLabs, Inc., Jan. 2, 2006, 69 pages.

International Search Report and Written Opinion dated May 31, 2011 issued by the Korean Intellectual Property Office as International Searching Authority in connection with related International Application No. PCT/US2010/002709 (7 pages).

U.S. Patent and Trademark Office; Office Action dated Sep. 13, 2011, as entered in related U.S. Appl. No. 12/001,819 (18 pages).

Amendment and Response dated Mar. 13, 2012, as filed in related U.S. Appl. No. 12/001,819 (21 pages).

Japanese Patent Office; Notification of First Office Action dated Mar. 21, 2012, as entered in related Japanese Application No. 2010522954 (10 pages).

Amendment and Response dated May 7, 2012, as filed in related U.S. Appl. No. 13/172,261 (30 pages).

Amendment and Response dated Apr. 2, 2012, as filed in related U.S. Appl. No. 12/702,768 (12 pages).

U.S. Patent and Trademark Office; Notice of Allowability dated May 2, 2012, as entered in related U.S. Appl. No. 12/702,768 (7 pages).

Amendment and Response dated May 7, 2012, as filed in related U.S. Appl. No. 13/172,389 (15 pages).

U.S. Patent and Trademark Office; Office Action dated Jun. 1, 2012, as entered in related U.S. Appl. No. 12/775,979 (6 pages).

Response to Examination Report dated Jun. 5, 2012, as filed in related Australian Patent Application No. 2008296979 (33 pages).

European Patent Office, Extended European Search Report (including Supplementary European Search Report and European Search Opinion) dated May 29, 2012, as issued in connection with related European Patent Application No. 08795673.6 (7 pages).

European Patent Office, Extended European Search Report (including Supplementary European Search Report and European Search Opinion) dated Jun. 1, 2012, as issued in connection with related European Patent Application No. 08795674.4 (6 pages).

U.S. Patent and Trademark Office; Notice of Allowability dated Jun. 5, 2012, as entered in related U.S. Appl. No. 13/172,261 (4 pages).

U.S. Patent and Trademark Office; Office Action dated May 18, 2012, as entered in related U.S. Appl. No. 12/001,819 (21 pages).

International Search Report and Written Opinion dated Jun. 22, 2012 issued by the Korean Intellectual Property Office as International Searching Authority in connection with related International Application No. PCT/US2012/023488 (8 pages).

Patent Examination Report No. 3 dated Jul. 6, 2012 from the Australian Patent Office (Australian Government IP Australia) in connection with related Australian Application No. 2008296979 (4 pages).

Decision of Rejection issued Jul. 31, 2012 by the Japanese Patent Office in connection with related Japanese Application No. 2010-522953 (2 pages).

Amendment and Response dated Sep. 4, 2012, as filed in related U.S. Appl. No. 12/775,979 (7 pages).

Amendment and Response dated Sep. 10, 2012, as filed in related U.S. Appl. No. 12/783,415 (40 pages).

International Search Report and Written Opinion dated Feb. 25, 2009 issued by the Korean Intellectual Property Office as International Searching Authority in connection with related International Application No. PCT/US2008/010199 (7 pages).

Office Action dated Jul. 17, 2009, as entered in grandparent U.S. Appl. No. 11/895,909 (11 pages).

Amendment and Response dated Oct. 15, 2009, as filed in grandparent U.S. Appl. No. 11/895,909 (14 pages).

Notice of Allowability dated Dec. 23, 2009, as entered in grandparent U.S. Appl. No. 11/895,909 (4 pages).

Office Action dated May 19, 2010, as entered in co-pending, parent U.S. Appl. No. 12/715,195 (10 pages).

Amendment and Response dated Jul. 19, 2010 as filed in co-pending, parent U.S. Appl. No. 12/715,195 (20 pages).
International Search Report and Written Opinion dated Mar. 6, 2009 issued by the Korean Intellectual Property Office as International Searching Authority in connection with International Application No. PCT/US2008/010200 (8 pages).
International Search Report and Written Opinion dated Jul. 15, 2010 issued by the United States Patent and Trademark Office as International Searching Authority in connection with related International Application No. PCT/US10/01354 (10 pages).
International Search Report and Written Opinion dated Jul. 23, 2010 issued by the United States Patent and Trademark Office as International Searching Authority in connection with related International Application No. PCT/US10/01489 (11 pages).
Michael Ahlheim and Friedrich Schneider, Allowing for Household Preferences in Emission Trading, A Contribution to the Climate Policy Debate, Environmental and Resource Economics, vol. 21, pp. 317-342, 2002 Kluwer Academic Publishers, Printed in the Netherlands (26 pages).
Olivier Rousse, Environmental and economic benefits resulting from citizens' participation in $CO_2$ emissions trading: An efficient alternative solution to the voluntary compensation of $CO_2$ emissions, Energy Policy 36 (2008), pp. 388-397 (10 pages).
Notice of Allowability dated Aug. 31, 2010, as entered in parent U.S. Appl. No. 12/715,124 (5 pages).
Notice of Allowability dated Sep. 8, 2010, as entered in parent U.S. Appl. No. 12/715,195 (4 pages).
B.J. Kirby, Spinning Reserve from Responsive Loads, Oak Ridge National Laboratory, United States Dept. of Energy, Mar. 2003 (54 pages).
Eric Hirst and Brendan Kirby, Opportunities for Demand Participation in New England Contingency-Reserve Markets, New England Demand Response Initiative, Feb. 2003 (15 pages).
Pablo A. Ruiz and Peter W. Sauer, Valuation of Reserve Services, IEEE Proceedings of the $41^{st}$ Hawaii International Conference on System Sciences, 2008 (9 pages).
Eric Hirst and Richard Cowart, Demand Side Resources and Reliability, New England Demand Response Initiative, Mar. 20, 2002 (32 pages).
C.W. Gellings and W.M. Smith, Integrating Demand-Side Management into Utility Planning, Proceedings of the IEEE, vol. 77, Issue: 6, Jun. 1989, pp. 908-918 (Abstract only).
M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).
L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).
Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).
Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

* cited by examiner

METHOD AND APPARATUS FOR EFFECTING CONTROLLED RESTART OF ELECTRICAL SERVCIE WITH A UTILITY SERVICE AREA

CROSS REFERENCE TO RELATED APPLICATIONS

This application is a continuation-in-part of U.S. application Ser. No. 12/715,124 filed on Mar. 1, 2010 now U.S. Pat. No. 8,010,812, which is a division of U.S. application Ser. No. 11/895,909 filed on Aug. 28, 2007, now U.S. Pat. No. 7,715,951 B2, and is incorporated herein by this reference as if fully set forth herein. This application is also a continuation-in-part of U.S. application Ser. No. 12/715,195 filed on Mar. 1, 2010 now U.S. Pat. No. 8,032,233, which is also a division of U.S. application Ser. No. 11/895,909, now U.S. Pat. No. 7,715,951 B2, and is incorporated herein by this reference as if fully set forth herein. This application is further a continuation-in-part of U.S. application Ser. No. 12/702,640 filed on Feb. 9, 2010 now U.S. Pat. No. 8,131,403, which is a continuation-in-part of U.S. application Ser. No. 11/895,909, now U.S. Pat. No. 7,715,951 B2, claims priority upon U.S. Provisional Application No. 61/150,978 filed on Feb. 9, 2009 and U.S. Provisional Application No. 61/176,752 filed on May 8, 2009 for commonly disclosed subject matter, and is incorporated herein by this reference as if fully set forth herein. This application further claims priority under 35 U.S.C. §119(e) upon U.S. Provisional Application Ser. No. 61/279,072 filed on Oct. 15, 2009 solely to the extent of the subject matter disclosed in said provisional application, which application is incorporated herein by this reference as if fully set forth herein. Finally, this application is related to commonly-owned U.S. application Ser. No. 12/001,819 filed on Dec. 13, 2007 and commonly-owned U.S. application Ser. No. 12/775,979 filed on May 7, 2010.

BACKGROUND OF THE INVENTION

1. Field of the Invention

The present invention relates generally to the field of electric power generation and distribution systems and, more particularly, to a method and apparatus for effecting controlled restart of electrical service throughout a utility's service area after a power outage.

2. Description of Related Art

In electric power systems, power outages occur for a variety of reasons. Some outages are planned by a utility to temporarily reduce system load during periods of peak loading or to accommodate infrastructure servicing or improvements. However, most outages are unplanned and result from inclement weather, unexpected excessive demand, or system control errors.

In addition, brown-outs may occur when system load has been cut to offset or account for power quality or supply issues. Brown-outs are used to avoid "dropping" or having a catastrophic failure of a grid area for a generating or distributing utility. Each utility's grid area is interconnected with breakers and tie lines between one or more adjacent utilities so that a grid area that becomes problematic can be isolated from other portions of the grid so as not to bring down the entire system.

The restoration of power to utility customers after a blackout or brown-out is generally considered to be a good thing to customers. However, restoring power to many customers simultaneously or within a very short period of time can cause additional problems. For example, power restoration after a planned or unplanned power outage often causes a momentary and sometimes harmful "spike" or surge in power on the utility grid from generation and distribution perspectives. An exemplary graph 100 illustrating power demand versus time during a power restoration period is shown in FIG. 1. As illustrated in the graph 100, the simultaneous restoration of power to many service points in a utility's service area may cause energy demand 101 to surge or spike momentarily to a very high level or peak for the utility. The power spike may temporarily exceed the acceptable peak power supply 103 of the utility, as illustrated in exemplary form in FIG. 1. If the power spike during restoration exceeds the acceptable peak power supply 103 of the utility, the utility may be forced to use some of its reserve power, typically called "operating reserve." FIG. 2 is a table or chart illustrating a utility's typical energy capacity. As shown in FIG. 2, operating reserve typically includes three types of power: so-called "regulating reserve," "spinning reserve," and "non-spinning reserve" or "supplemental reserve." Spinning reserve and non-spinning reserve are collectively referred to as "contingency reserve." Therefore, operating reserve generally consists of regulating reserve and contingency reserve. The types of operating reserve are discussed in more detail below as they relate to the present invention.

Atypical changes in demand may occur that are so abrupt that they cause a substantial fluctuation in line frequency within the utility's electric grid. To respond to and correct for such changes in line frequency, utilities typically employ an Automatic Generation Control (AGC) process or subsystem to control the utility's regulating reserve. Thus, the regulating reserve component of a utility's operating reserve is typically limited to correcting for changes in line frequency. In other words, regulating reserve is typically used to regulate line frequency.

On the other hand, normal fluctuations in demand, which do not typically affect line frequency, are responded to or accommodated through certain activities, such as by increasing or decreasing an existing generator's output or by adding new generation capacity. Such accommodation is generally referred to as "economic dispatch." The contingency reserve component of a utility's operating reserve (i.e., spinning reserve and non-spinning reserve) provides the additional generating capacity that is available for use as economic dispatch to meet changing (increasing) demand.

As shown in FIG. 2, spinning reserve is additional generating capacity that is already online (connected to the power system) and, thus, is immediately available or is available within a short period of time after a determined need (e.g., within ten (10) to fifteen (15) minutes, as defined by the applicable North American Electric Reliability Corporation (NERC) regulation). Non-spinning reserve (also called supplemental reserve) is additional generating capacity that is not online, but is required to respond within the same time period as spinning reserve. Typically, when additional power is needed for use as economic dispatch, a power utility will make use of its spinning reserve before using its non-spinning reserve because the generation methods used to produce spinning reserve tend to be cheaper than the methods used to produce non-spinning reserve or the perceived environmental impact resulting from the production of non-spinning reserve may be less desirable than the perceived environmental impact resulting from the production of spinning reserve. For example, spinning reserve may be produced by increasing the torque of rotors for turbines that are already connected to the utility's power grid or by using fuel cells connected to the utility's power grid; whereas, non-spinning reserve may be produced by turning off resistive and inductive loads, such as heating/cooling systems attached to consumer locations, or by activating a standby (e.g., nuclear or coal-fired) power plant. However, making use of either spinning reserve or non-spinning reserve (i.e., contingency reserve) results in additional costs to the utility due to the costs of fuel, incentives paid to consumers for traditional demand response, maintenance, and so forth. As a result, utilities use their contingency reserve only when absolutely necessary. Use of contingency reserve is typically referred to as "cold load pickup" and may last from seconds to a few minutes.

While the additional costs associated with use of contingency reserve are generally undesired, such costs may outweigh the more onerous result of a restart spike, which may overload and cause damage to some parts of the utility's grid. A damaged grid can cause further power problems to service areas sourced by the grid immediately after a restart. Thus, when restarting electrical service after an outage, utilities are currently required to balance the costs of using contingency reserve against the costs of possible damage to the grid.

Therefore, a need exists for an apparatus and method for effecting a controlled restart within a utility service area that mitigates the likelihood of a restart spike without requiring use of a utility's contingency reserve.

DETAILED DESCRIPTION OF EXEMPLARY EMBODIMENTS

Figure 1:
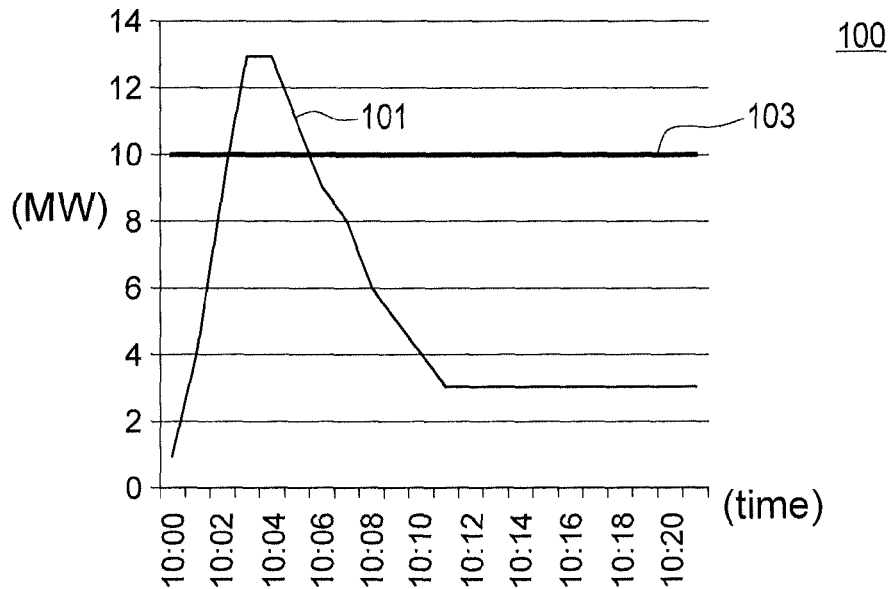
FIG. 1 is an exemplary graph showing how energy demand can spike during a conventional restart after a power outage.
Figure 2:
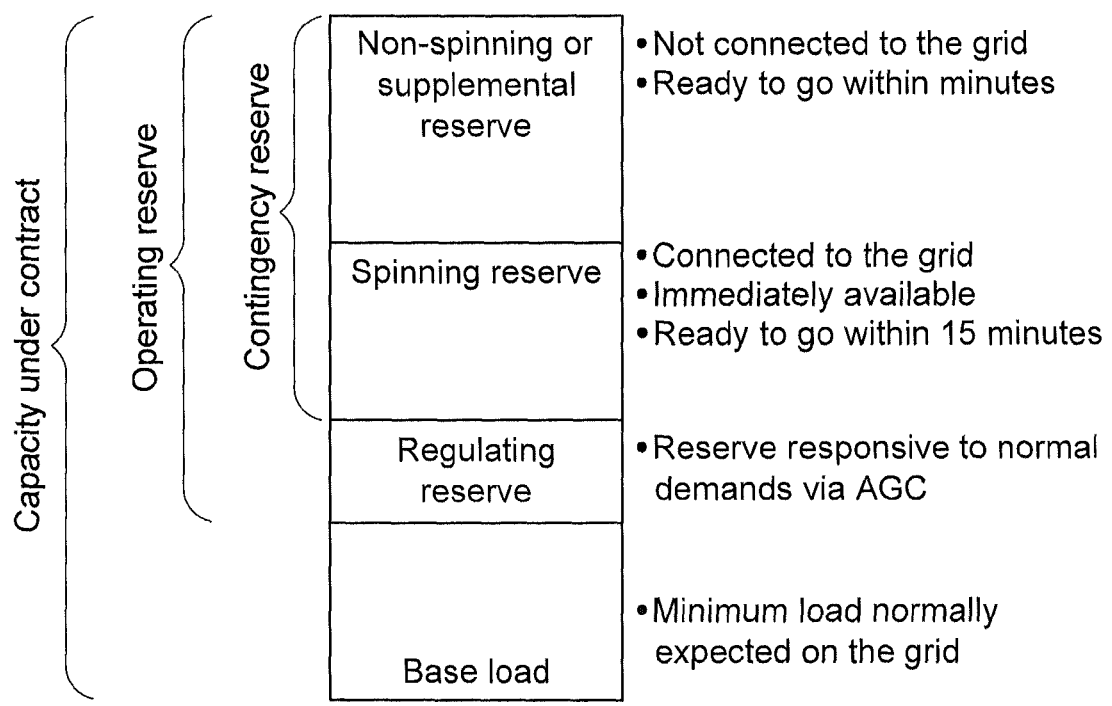
FIG. 2 is a chart showing the various conventional power reserves available to a utility.

Before describing in detail exemplary embodiments that are in accordance with the present invention, it should be observed that the embodiments reside primarily in combinations of apparatus components and processing steps related to effecting a controlled restart of electrical service to service points within an electric utility's service area so as to mitigate the likelihood of a cold restart power spike without requiring use of the utility's contingency reserve. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "includes," "including," "contains," "containing," "comprises," "comprising," "has," "having" and any other variations thereof are intended to cover a non-exclusive inclusion, such that a process, method, article, or apparatus that includes, contains, comprises, or has a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

The term "ZigBee" refers to any wireless communication protocol adopted by the Institute of Electronics & Electrical Engineers (IEEE) according to standard 802.15.4 or any successor standard(s), and the term "Bluetooth" refers to any short-range communication protocol implementing IEEE standard 802.15.1 or any successor standard(s). The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Code Division Multiple Access (CDMA) Evolution Date-Optimized (EVDO) Revision A (CDMA EVDO Rev. A)" refers to the communication protocol adopted by the ITU under standard number TIA-856 Rev. A. The term "Long Term Evolution (LTE)" refers to any communication protocol based on the Third Generation Partnership Project (3GPP) Release 8 from the ITU or based on a communication protocol from another mobile telecommunications standards body referring to the evolution of GSM-based networks to voice, video, and data standards anticipated to be replacement protocols for HSPA and EVDO.

The terms "utility," "electric utility," "power utility," and "electric power utility" refer to any entity that generates and/or distributes electrical power to its customers, that purchases power from a power-generating entity and distributes the purchased power to its customers, or that supplies electricity created either actually or virtually by alternative energy sources, such as solar power, wind power, load control, or otherwise, to power generation or distribution entities through the Federal Energy Regulatory Commission (FERC) electrical grid or otherwise. The terms "energy" and "power" are used interchangeably herein. The terms "utility service area," "utility's service area," and "service area" may refer to an entire geographical area to which electrical power is supplied by a particular utility or any portion of such geographical area.

It will be appreciated that embodiments or components of the systems described herein may be comprised of one or more conventional processors and unique stored program instructions that control the one or more processors to implement, in conjunction with certain non-processor circuits, some, most, or all of the functions for effecting controlled restart of electrical service to service points within an electric utility's service area as described herein. The non-processor circuits may include, but are not limited to, radio receivers, radio transmitters, antennas, modems, signal drivers, clock circuits, power source circuits, relays, meters, memory, smart breakers, current sensors, and user input devices. As such, these functions may be interpreted as steps of a method to store and distribute information and control signals between devices in a power load management system so as to effect a controlled restart of electrical service. Alternatively, some or all functions could be implemented by a state machine that has no stored program instructions, or in one or more application specific integrated circuits (ASICs), in which each function or some combinations of functions are implemented as custom logic. Of course, a combination of the foregoing approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Generally, the present invention encompasses a method and apparatus for effecting controlled restart of electrical service to service points within an electric utility's service area after a power outage or other stoppage of power. In accordance with one embodiment, a random number is determined and associated with a single service point or a group of service points within the service area. Where the random number is associated with a group of service points, the quantity of service points in the group is less than the total quantity of service points in the utility service area affected by the power outage. The random number may be determined by a central controller (e.g., an active load director) located remote from the service points or by a control device (e.g., an active load client) located at a service point. The control device controls the flow of electrical power to power consuming devices (e.g., heating, ventilation, and air conditioning (HVAC) units, water heaters, pool heaters, pool pumps, water softeners, washers, dryers, appliances, equipment, lighting, etc.) located at the service point. For example, the random number may be generated and retained by the central controller or may be communicated (e.g., as an Internet Protocol (IP) data packet) to the service point's control device (e.g., where the service point's control device is operating with battery backup or has had power restarted to it) or to the group of service points' control devices. Still further, the random number may be generated by each service point's control device.

After determination of the random number, a time at which to restart electrical service at a service point or at a group of service points is determined based at least on the random number. For example, when the central controller generates the random number, the central controller may further determine that electrical service may be restored or restarted to a particular service point or group of service points when a number assigned to or associated with the service point or group of service points matches the random number. In such a case, the random number may be a number randomly chosen between one and the total quantity of service points or groups of service points in the service area (or the portion thereof) affected by the power outage. The time at which restart may occur would be promptly or immediately after a match to the random number was detected. To inform a service point control device (or control devices for a group of service points) regarding the power restart time, the central controller may transmit a restart message or command to the control device(s) instructing the control device(s) to immediately permit a flow of power to controlled power consuming devices or providing a time at which the flow of power may be permitted.

Alternatively, when the control device at a service point generates the random number, the control device may further determine whether the generated random number matches a number transmitted to it from the central controller. The number transmitted by the central controller may be a random number generated by the central controller or a number in a sequence of numbers being traversed by the central controller. If a match occurs, then electrical service may be immediately restarted at the service point. If a match does not occur, then restart of electrical service is delayed until a match occurs. In this case, the original random number generated by the service point's control device may be compared to numbers sent over time by the central controller or anew random number may be generated by the control device prior to receipt of a new number from the central controller.

Alternatively, the service point's control device may determine its own restart time independent of receiving numbers or restart messages from the central controller. In this case, the control device may estimate an amount of time required to complete a restart of electrical service in the utility service area affected by the power outage. In one embodiment, the amount of time required for restart may be received from the central controller or be prestored in a memory of the control device. The control device may also determine a start time for commencing the restart of electrical service in the utility service area. The start time may be the time at which the control device begins receiving electrical power from the utility or may be indicated in a message received from the central controller. Based on the start time and the amount of time required to complete the restart, the control device estimates a completion time for completing the restart of electrical service in the utility service area. For example, the estimated completion time may be the start time plus the length of time required to complete the restart.

To determine its own start time for supplying electrical power to power consuming devices under its control, the service point control device may alternatively generate a random number and determine a random start time for restarting electrical service at the service point based on the random number and the previously determined overall start time for commencing restoration of electrical service in the utility service area. For example, the random start time may be the start time plus the random number where the random number is in units of time and is between zero and the amount of time required to complete the restart of electrical service in the utility service area. After generating the random start time, the control device compares the random start time to a current time of day. If the random start time is no later than the current time of day, the control device restarts electrical service at the service point at the random start time. If the random start time is later than the current time of day, the control device may repeat the process again. In other words, the control device may generate a new random number, determine a new random start time based on the new random number and the start time, compare the new random start time to the current time of day, and restart electrical service at the service point at the new random start time in the event that the new random start time is no later than the current time of day.

Once the appropriate restart time has been determined, electrical power is supplied to the power consuming device or devices located at the service point or group of service points at the restart time. For example, the control device at a service point to be restarted may send a message to a controlled device, such as a smart appliance control module or a smart breaker, instructing the controlled device to permit current flow (e.g., by closing an appropriate switch or switches) to the associated power consuming device or devices.

In yet another embodiment, customer profiles may be stored in a database accessible by the central controller and such customer profiles may be used to determine a time for restarting electrical service at a particular customer's service point. For example, the central controller may determine a customer profile associated with a particular service point by retrieving the profile from the database or requesting it from another source, such as a control device installed at the service point. In one embodiment, the customer profile includes a connection/disconnection profile that includes information about power consuming devices (such as medical-related devices) used by the customer that may adversely affect the customer in the event of a loss of power, an indication of a priority of service for the service point, and other connect/disconnect information about the customer. The central controller may then determine a restart time for the service point based on the customer profile alone or in combination with other information or procedures, such as in combination with the random number generation and analysis procedure described above. For example, after the central controller generates a random number and determines that the number matches a number associated with a particular service point (or a group of service points that includes the particular service point), the central controller may retrieve a customer profile for the service point to determine a priority of service for the service point. If the priority of service is high (e.g., because the service point includes medical equipment or is used by someone with health problems), then the central controller may send a restart command to the control device at the service point. On the other hand, if the priority of service is low and only service points with higher priorities of service are being restarted, then the central controller may withhold the restart message, leaving the service point completely or substantially without power (although sufficient power may be supplied to the service point to supply the control device, for instance).

In another embodiment, the central controller may determine a priority of service for one or more service points in the service area based on stored customer profiles associated with the service points. For example, as discussed above, each customer profile may be stored in a database and include an indication of the service point's priority of service. The central controller may then retrieve the priority of service indication for a service point from the database. The central controller may also determine a prioritized order for restarting electrical service to the service points based on priorities of service. For example, the prioritized order may require the service points with the highest priorities of service to be restarted first, the service points with the second highest priorities of service to be restarted second, and so on. If a service point's priority of service matches a priority of service for which electrical service is being restarted according to the prioritized order, then the central controller transmits a restart command to the control device installed at the particular service point so as to commence power restoration at the service point. If a quantity of service points having the same priority of service exceeds a predetermined threshold established to prevent a restart power spike or use of the utility's operating reserve, the central controller may generate a random number for each service point in the group of service points having the same priority of service. The central controller may then transmit the restart command to a particular service point of the group based on the random number for the particular service point. For instance, the central controller may compare the random number to numbers previously associated with the service points and determine whether a match has occurred as discussed above.

In a further embodiment, service point characteristics may be stored in a database accessible by the central controller and such service point characteristics may be used to determine a time for restarting electrical service at a particular customer's service point. For example, the central controller may determine characteristics, such as geographic location, power consumption, or service priority associated with a particular service point or group of service points by retrieving the data relating to the characteristics from the database or requesting the data from another source, such as a control device installed at the service point. The central controller may then determine a restart time for the service point based on the characteristics alone or in combination with other information or procedures, such as in combination with the random number generation and analysis procedure described above. For example, after the central controller generates a random number and determines that the number matches a number associated with a particular service point (or a group of service points that includes the particular service point), the central controller may retrieve a customer profile for the service point to determine a priority of service for the service point. If the priority of service is high (e.g., because the service point includes medical equipment or is used by emergency personnel, healthcare personnel, one or more elderly persons, or someone with health problems), then the central controller may send a restart command to the control device at the service point. On the other hand, if the priority of service is low and only service points with higher priorities of service are being restarted, then the central controller may withhold the restart message, leaving the service point completely or substantially without power (although power may be supplied to the service point to supply the control device, for instance).

In yet another embodiment, the central controller may logically divide the service points into multiple groups based on at least one characteristic (e.g., location, power consumption, or business type) that is common among service points within a particular group. In such a case, the central controller may determine a prioritized order for restarting electrical service to each of the service points based on service point characteristics. For example, the central controller may be programmed to restart service points closest to a power generating plant or having an average power consumption above a predetermined threshold first. Based on the prioritized order and the particular service point characteristic or characteristics, the central controller may select a group of service points at which to restart electrical service and transmit a restart command to control devices installed at the selected group of service points.

In yet another embodiment, a central controller and the control devices installed at the service points may cooperate with each other to determine an order for restarting electrical service to the service points. For example, the central controller may select a number within a predetermined set of numbers (e.g., from one to a quantity of service points in the service area affected by the power outage). The central controller may then transmit a restart message containing the selected number to the control devices. Each control device may generate a respective random number within the predetermined set of numbers and compare the random number to the received (selected) number. If a match occurs, then the control device supplies electrical power to at least one power consuming device at the control device's service point.

In still a further embodiment, a control device installed at a service point in a utility service area affected by a power outage may generate a random number within a predetermined set of numbers (e.g., from one to a quantity of service points in the service area). The control device may also receive a restart message from a central controller located remotely from the service point. The restart message includes a number within the predetermined set of numbers. The control device then compares the number in the restart message to the random number generated by the control device and, if a match occurs, supplies electrical power to one or more power consuming devices at the service point to effectively restart power to the service point. If the number in the restart message does not match the random number, the control device may generate a new random number within the predetermined set of numbers and receive a new restart message that includes another number within the predetermined set of numbers. In this case, the control device compares the number in the new restart message to the new random number and, if a match occurs, supplies electrical power to the power consuming device or devices located at the service point. Alternatively, if the number in the restart message does not match the random number, the control device may maintain the same random number instead of generating a new one and compare the random number to the number in a new restart message received from the central controller. If the random number matches the number in the new restart message, the control device supplies electrical power to the power consuming device or devices located at the service point. Thus, in this embodiment, if the originally-generated random number does not match the number in the received restart message, the control device either generates a new random number or maintains the originally-generated random number for comparison to the number in the next restart message.

In another embodiment, a central controller (e.g., an active load director) for an active load management system includes a database, an event manager (e.g., a master event manager), and a client device manager (e.g., an active load client manager). The database is operable to store a plurality of numbers associated with a plurality of service points located in a service area of a utility. The event manager is operably coupled to the database and operable to: (i) determine whether electrical power can be restored to the service points after a power outage has occurred; (ii) generate a random number responsive to a determination that electrical power can be restored; (ii) compare the random number to each of the numbers stored in the database; and (iv) generate a restart message when the random number matches one of the stored numbers. The client device manager is operably coupled to the event manager and operable to transmit the restart message to one or more active load clients or other similar control devices installed at service points that are associated with the number that matched the random number. For example, in one embodiment, each service point is associated with a number stored in the database (e.g., a sequential list of numbers is stored in the database with each number corresponding to one of the service points in the utility's service area). The event manager generates a random number between one and the total quantity of service points in the service area (or the portion thereof affected by a power outage). If the random number matches a number associated with a service point, the client device manager transmits a restart message to the chosen service point. If no match occurs, another random number is generated and the process repeats. In an alternative embodiment, all or some of the numbers stored in the database may be associated with groups of service points instead of individual service points. A group of service points may correspond to the residential service points of a neighborhood or subdivision or all service points in a town or city. In this case, when the random number matches a stored number corresponding to a group of service points, the client device manager transmits the restart message to all the service points in the group.

By selectively restarting electrical service to service points in a controlled manner through communications between a central controller, such as an active load director, and control points, such as active load clients installed at service points throughout a utility's service area, the present invention reduces the likelihood of startup power spikes causing instability and possible damage to the utility's power grid. Additionally, such a controlled restart enables the utility to maintain its power output at or below its acceptable peak level and, thereby, avoid use of some or all of its operating reserve.

Figure 3:
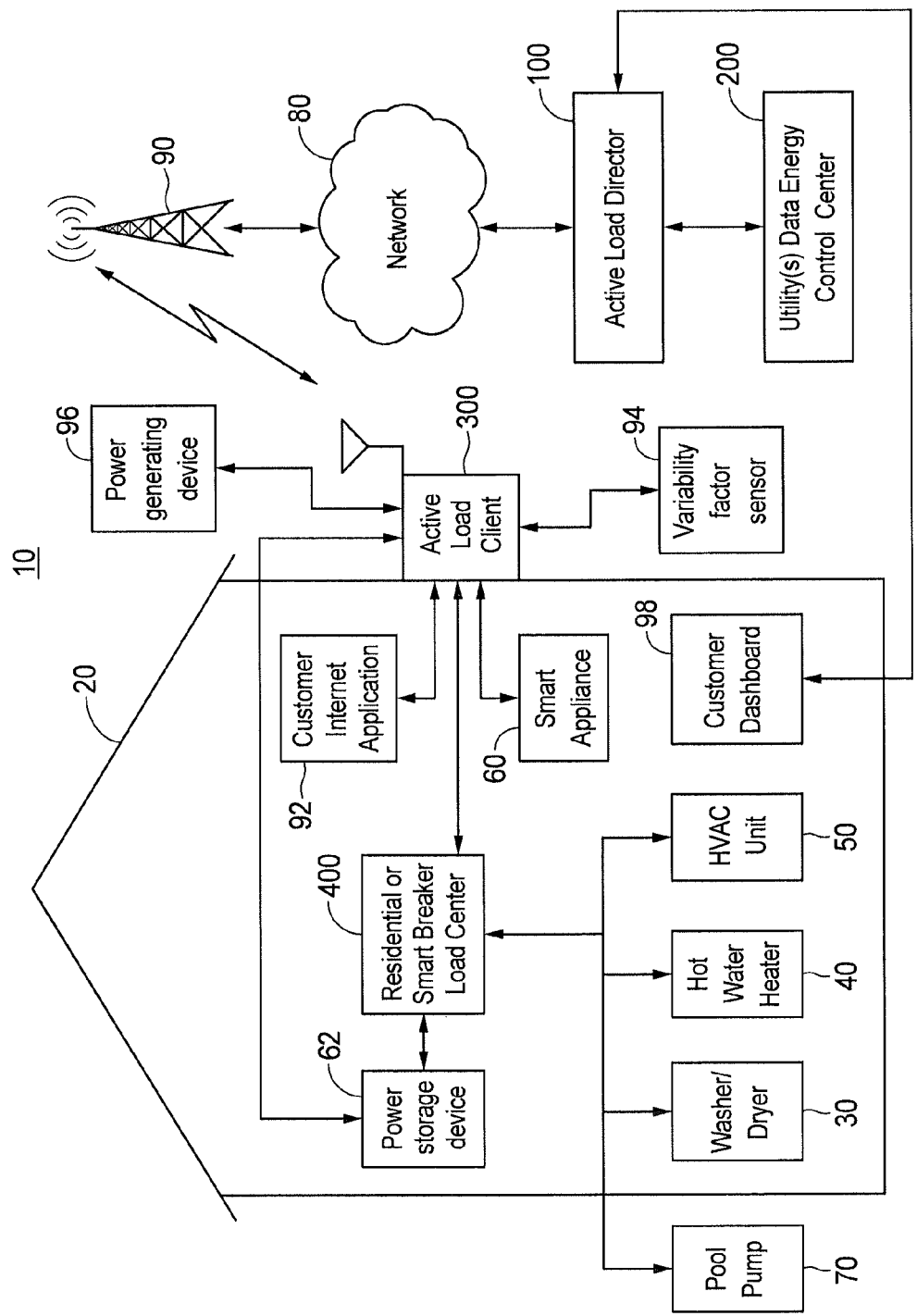
FIG. 3 is a block diagram of an exemplary IP-based, active load management system in accordance with one embodiment of the present invention.

The present invention can be more readily understood with reference to FIGS. 3-8, in which like reference numerals designate like items. FIG. 3 depicts an exemplary IP-based active load management system (ALMS) 10 that may be utilized by an electric utility, which may be a conventional power-generating utility or a virtual utility, in accordance with the present invention. The description of the ALMS 10 provided below is limited to specific disclosure relating to embodiments of the present invention. A more general and detailed description of the ALMS 10 is provided in commonly-owned U.S. Pat. No. 7,715,951 B2, which is incorporated herein by reference. For example, U.S. Pat. No. 7,715,951 provides details with respect to the exemplary operational implementation and execution of control events to interrupt or reduce power to devices located at service points, such as residences and businesses. The use of an ALMS 10 to implement a virtual utility is described in detail in commonly-owned, co-pending U.S. application Serial No. 12/001,819, which was filed on Dec. 13, 2007, was published as U.S. Patent Application Publication No. US 2009/0063228 A1 on Mar. 5, 2009, and is incorporated herein by reference.

The exemplary ALMS 10 monitors and manages power distribution via an active load director (ALD) 100 or other centralized controller connected between one or more utility control centers (UCCs) 200 (one shown) and one or more active load clients (ALCs) 300 (one shown) or other control devices installed at one or more service points 20 (one shown). The ALD 100 may communicate with the utility control center 200 and each active load client 300 either directly or through a network 80 using the Internet Protocol (IP) or any other address or connection-based protocols (e.g., Ethernet). For example, the ALD 100 may communicate using RF systems operating via one or more base stations 90 (one shown) and using one or more wireless communication protocols, such as GSM, ANSI C12.22, Enhanced Data GSM Environment (EDGE), HSPA, LTE, Time Division Multiple Access (TDMA), or CDMA data standards, including CDMA 2000, CDMA Revision A, CDMA Revision B, and CDMA EVDO Rev. A. Alternatively, or additionally, the ALD 100 may communicate via a digital subscriber line (DSL) capable connection, a cable television based IP capable connection, a satellite connection, or any combination thereof. In the exemplary embodiment shown in FIG. 3, the ALD 100 communicates with one or more active load clients 300 using a combination of traditional IP-based communication (e.g., over a trunked line) to a base station 90 and a wireless channel implementing the HSPA or EVDO protocol from the base station 90 to the active load client 300. The distance between the base station 90 and the service point 20 or the active load client 300 is typically referred to as the "last mile" even though the distance may not actually be a mile. The ALD 100 may be implemented in various ways, including, but not limited to, as an individual server, as a blade within a server, in a distributed computing environment, or in other combinations of hardware and software. In the present disclosure, the ALD 100 is described as embodied in an individual server to facilitate an understanding of the present invention.

Each active load client 300 is accessible through a specified address (e.g., IP address) and controls and monitors the state of individual smart breaker modules or intelligent appliances 60 installed at the service point 20 (e.g., in the business or residence) with which the active load client 300 is associated (e.g., connected or supporting). Each active load client 300 is associated with a single residential or commercial customer. In one embodiment, the active load client 300 communicates with a residential load center 400 that contains smart breaker modules, which are able to switch from an "ON" (active) state to an "OFF" (inactive) state, and vice versa, responsive to signaling from the active load client 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance (e.g., a washer/dryer 30, a hot water heater 40, an HVAC unit 50, or a pool pump 70). In an alternative embodiment, IP addressable relays or device controllers that operate in a manner similar to a "smart breaker" may be used in place of smart breakers, but would be installed coincident with the load under control and would measure the startup power, steady state power, power quality, duty cycle and energy load profile of the individual appliance 60, HVAC unit 40, pool pump 70, hot water heater 40, or any other controllable load as determined by the utility or end customer.

Additionally, the active load client 300 may control individual smart appliances directly (e.g., without communicating with the residential load center 100) via one or more of a variety of known communication protocols (e.g., IP, Broadband over PowerLine (BPL) in its various forms, including through specifications promulgated or being developed by the HOMEPLUG Powerline Alliance and the IEEE, Ethernet, Bluetooth, ZigBee, Wi-Fi (IEEE 802.11 protocols), HSPA, EVDO, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, the smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

The active load client 300 may further be coupled to one or more variability factor sensors 94. Such sensors 94 may be used to monitor a variety of variability factors or parameters affecting operation of the devices, such as inside and/or outside temperature, inside and/or outside humidity, time of day, pollen count, amount of rainfall, wind speed, and other factors or parameters. The service point may also include a power storage device 62 coupled to the active load client 300 and/or the residential load center 400. The power storage device 62 is described in detail in commonly-owned, co-pending U.S. application Ser. No. 12/783,415.

Figure 4:
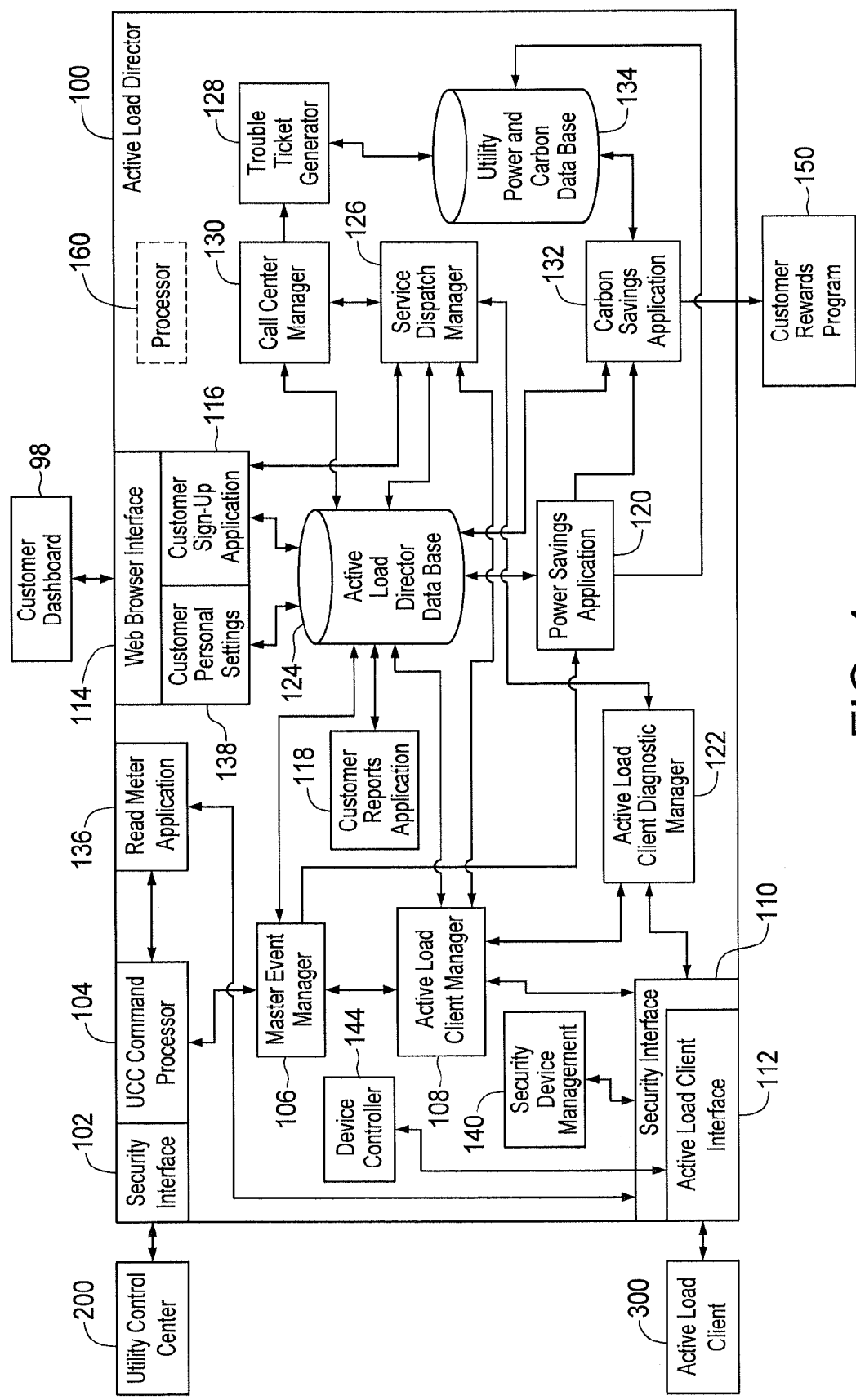
FIG. 4 is a block diagram illustrating an exemplary active load director as shown and used in the active load management system of FIG. 3.

Referring now to FIG. 4, the ALD 100 may serve as the primary interface to customers, as well as to service personnel. In the exemplary embodiment depicted in FIG. 4, the ALD 100 is implemented as an individual server and includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon (P&C) database 134, a read meter application 136, a security device manager 140, and a device controller 144. The operational details of several of the elements of the ALD 100 are described below. The operational details of the remaining elements of the ALD 100 may be found in U.S. Pat. No. 7,715,951, U.S. application Ser. No. 12/702,640 (with respect to configuration of customer profiles and use thereof to select active load clients 300 for participation in load control events), and U.S. Patent Application Publication No. US 2009/0063228 A1 (with respect to use of the ALD 100 to implement a virtual utility), wherein the ALD 100 is also described in the context of an individual server embodiment. As those of ordinary skill in the art will readily recognize and appreciate, various applications and many other components of the ALD 100 may be executed or have their functions carried out by one or more processors 160 (one shown).

In one embodiment, the service point 20 may include a web-based user interface (e.g., Internet-accessible web portal) into the web browser interface 114 of the ALD 100. The web-based user interface is referred to herein as a "customer dashboard" 98. When the customer dashboard 98 is accessed by the customer via a computer, smart phone, personal digital assistant, or other comparable device, the customer dashboard 98 may be used by the customer to specify preferences for use by the ALMS 10 to control devices at the customer's service point 20. The customer dashboard 98 effectively provides the customer with access into the ALD 100. The ALD 100 (e.g., through the web browser interface 114) accepts inputs from the customer dashboard 98 and outputs information to the customer dashboard 98 for display to the customer. The customer dashboard 98 may be accessed from the service point 20 or remotely from any Internet-accessible device, preferably through use of a user name and password for security purposes. Thus, the customer dashboard 98 is preferably a secure, web-based interface used by customers to specify preferences associated with devices controlled by the ALD 100 and located at the customer's service point 20. The customer dashboard 98 may also be used to provide information requested by a customer personal settings application or the customer sign-up application 116 executed by the ALD 100 in connection with controlled devices and/or service point conditions or parameters. Customer preferences may include, for example, control event preferences (e.g., times, durations, etc.), bill management preferences (e.g., goal or target for maximum monthly billing cost), maximum and minimum boundary settings for environmental characteristics or conditions, and various other customer settings.

In one embodiment, customers use the customer dashboard 98 to interact with the ALD 100 through the web browser interface 114 and subscribe to some or all of the services offered by the ALMS 10 via the customer sign-up application 116. In accordance with the customer sign-up application 116, the customer enters customer personal settings 138 that contain information relating to the customer and the customer's service point 20 (e.g., residence or business), and specifies the extent of service to which the customer wishes to subscribe. Additional details of establishing customer profiles using the customer dashboard 98 are discussed below. Customers may also use the customer dashboard 98 to access and modify information pertaining to their existing accounts after they have been established.

Figure 5:
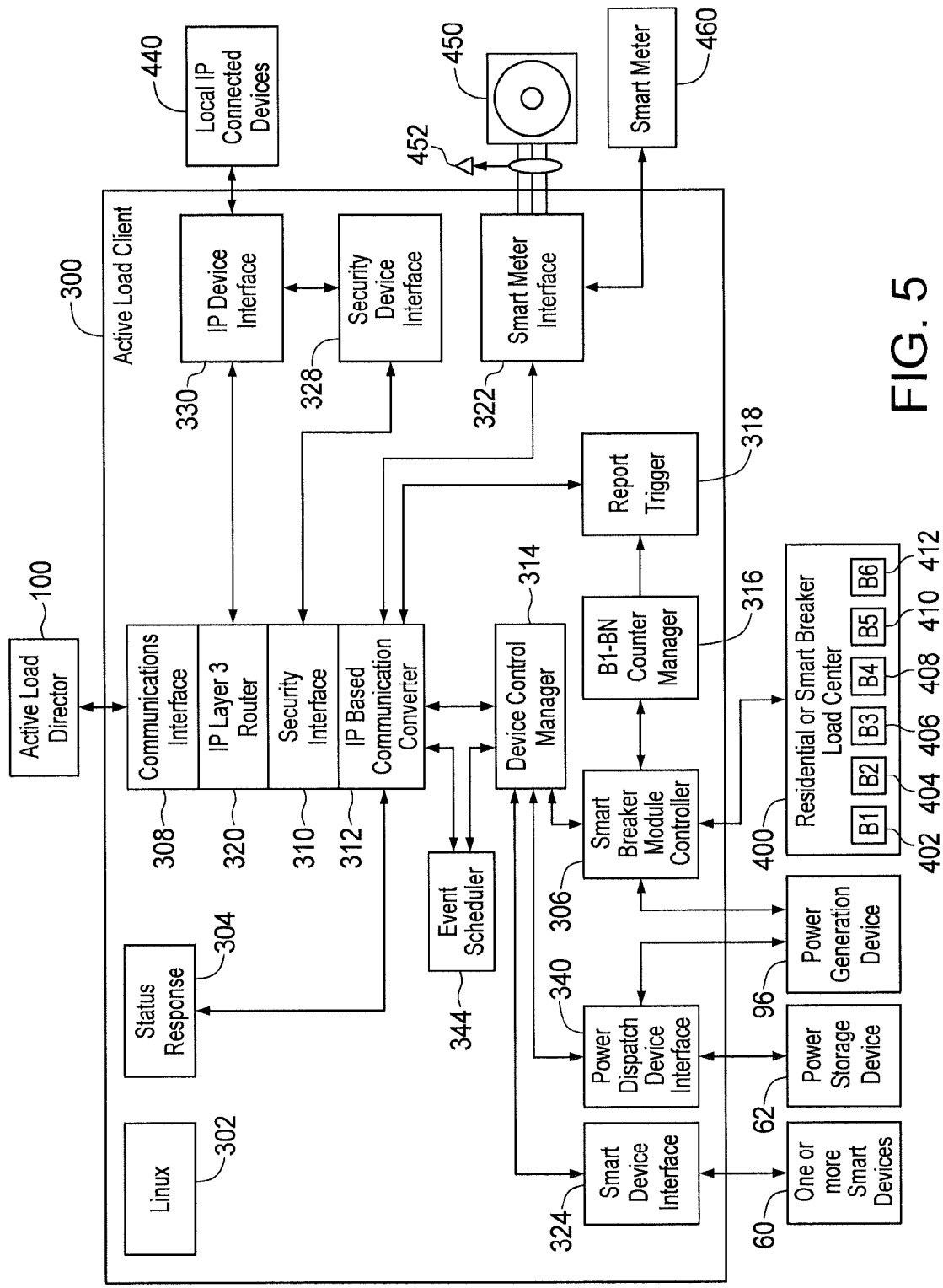
FIG. 5 is a block diagram illustrating an exemplary active load client and smart breaker module as shown and used in the active load management system of FIG. 3.

FIG. 5 illustrates a block diagram of an exemplary active load client (ALC) 300 in accordance with one embodiment of the present invention. The depicted active load client 300 includes an operating system 302, a status response generator 304, a smart breaker module controller 306, a communications interface 308, a security interface 310, an IP-based communication converter 312, a device control manager 314, a smart breaker (B1-BN) counter manager 316, a report trigger application 318, an IP router 320, a smart meter interface 322, a smart device interface 324, an IP device interface 330, a power dispatch device interface 340, and an event scheduler 344. The active load client 300, in this embodiment, is a computer or processor-based system located and installed on-site at a customer's service point 20 (e.g., residence or business). The primary function of the active load client 300 is to manage and control the power load levels of, or the supply of power to, controllable, power consuming devices located at the service point 20, which the active load client 300 oversees on behalf of the customer. In an exemplary embodiment, the active load client 300 may include dynamic host configuration protocol (DHCP) client functionality to enable the active load client 300 to dynamically request IP addresses for itself and/or one or more controllable devices 402-412, 60 managed thereby from a DHCP server on the host IP network facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. Finally, a power generation device 96 at the service point 20, when included, sends data about power generated at the service point 20 and delivered to the grid to the power dispatch device interface 340. Additional details regarding the contents and operation of the active load client 300 are provided in U.S. Pat. No. 7,715,951 and U.S. Patent Application Publication No. US 2009/0063228 A1.

In one embodiment, the ALD 100 collects, through the web browser interface 114, customer data, such as customer personal settings 138, and information about controllable power consuming devices located at the customer's service point 20 to generate a profile for each customer. The information from which a customer profile is created is preferably entered by the customer through the customer dashboard 98 or may be alternatively provided by other means, such as through a phone conversation with utility customer service personnel, a response to a survey, email, or entering data at the utility's website. When used, customer profiles are preferably stored within the ALD database 124 or in another database accessible by the ALD 100. The customer profile may be updated over time to include the customer's pattern of energy consumption based on power consumption data reported to the ALD 100 by the active load client 300 installed at the customer's service point 20. Details for creating customer profiles are disclosed in co-pending, U.S. patent application Ser. No. 12/702,640 entitled "System and Method for Determining and Utilizing Customer Energy Profiles for Load Control for Individual Structures, Devices, and Aggregation of Same," which was filed on Feb. 9, 2010, was published as U.S. Patent Application Publication No. US 2010/0145534 A1 on Jun. 10, 2010, and is incorporated herein by this reference as if fully set forth herein.

The active load clients 300 or other control devices (e.g., gateways), which are installed at service points 20 as an integrated part of the ALMS 10, have the capability to report the status of the power consumed at their respective service points 20 and to control when the power consuming devices at the service points 20 are allowed to receive or access electricity once power has been restored. Thus, the active load clients 300 and the ALD 100 may be programmed to implement one or more embodiments for effecting a controlled restart of the service points 20 in the utility's service area. According to one embodiment, a random number generator may be employed in the ALD 100 and/or each active load client 300 to start up each service point 20 in a generally random manner. By restarting service points 20 in a fairly random manner, the utility avoids or at least mitigates the undesirable effects of restarting all service points 20 at one time, such as system instability due to a power spike or unnecessary use of the utility's operating reserve.

Figure 6:
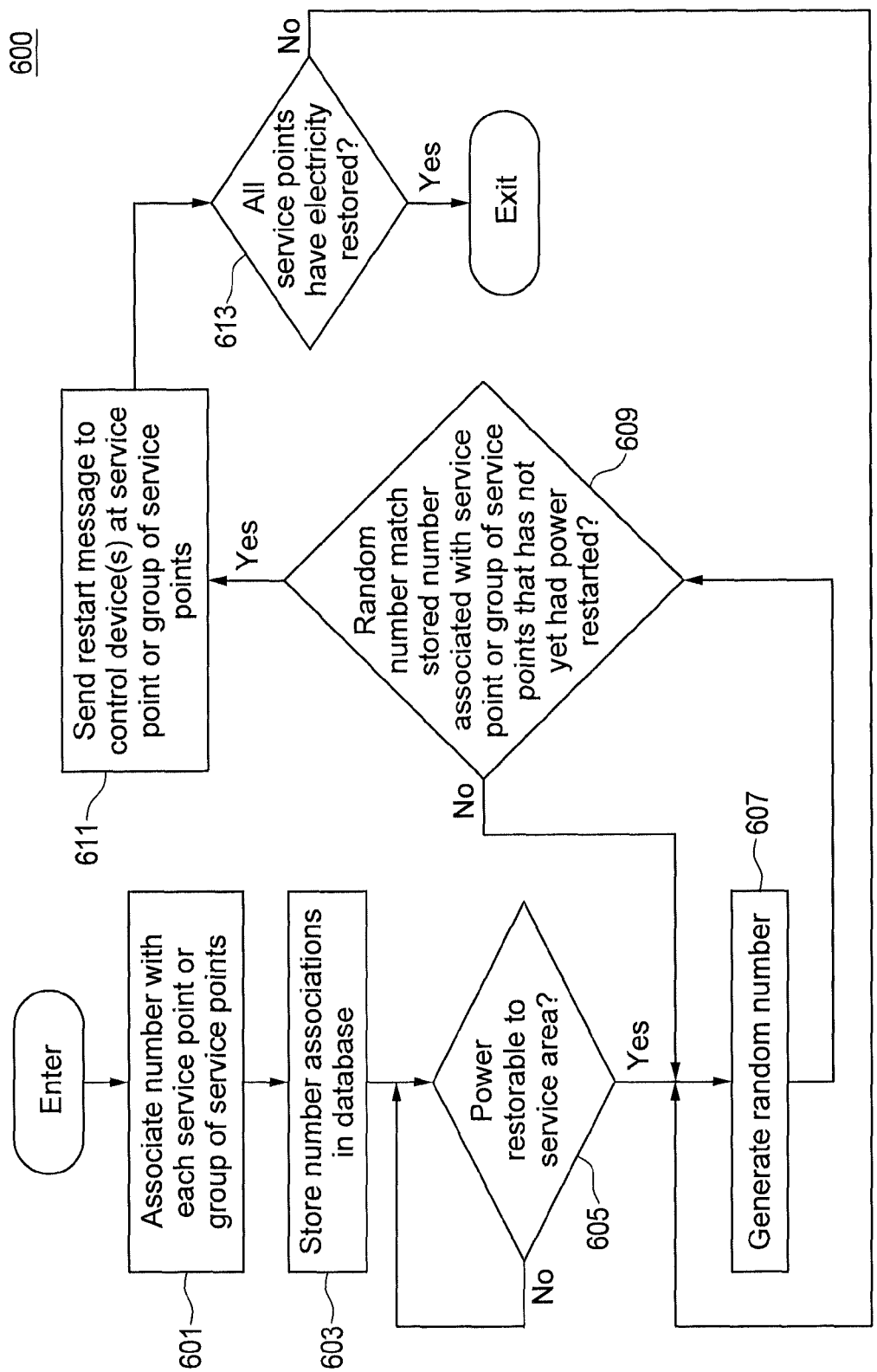
FIG. 6 is an operational flow diagram illustrating a method for a central controller to initiate a controlled restart of electrical service to service points in a utility service area, in accordance with one exemplary embodiment of the present invention.

In accordance with a first embodiment as illustrated in the logic flow diagram 600 of FIG. 6, the master event manager 106 of the ALD 100 associates (601) a number with each service point 20 and stores (603) the number associations in the ALD database 124. The number may be a customer number and, in a preferred embodiment, the numbers associated with all the service points 20 in a given utility service area are sequential in nature. The master event manager 106 includes a random number generator capable of randomly generating a number from one to a number corresponding to the total quantity of service points 20 in the entire service area or in a portion thereof that suffered an outage. Upon determining (605) that power can be restored to the service points 20 in the service area (e.g., after receiving an appropriate restore or restart command from the utility control center 200), the master event manager 106 generates (607) a random number and compares (609) it to the numbers associated with the service points 20, which are stored in the ALD database 124. When the random number matches a number associated with a service point 20 that has not yet been restarted, the master event manager 106 sends a restart message to the ALC manager 108, which in turn sends (611) the message to the active load client 300 of the service point 20. Generation of random numbers, comparison of the random numbers to stored service point numbers, and issuance of restart messages continue (613) until all the service points 20 in the affected service area have been restarted or had their electricity restored.

In an alternative embodiment, the random number generation and comparison approach of the foregoing embodiment may be applied to groups of service points, as opposed to just individual service points. In such an embodiment, the master event manager 106 may associate (601) each group of service points with a number and store (603) the numbers in the ALD database 124. Upon determining (605) that power can be restored to the service points 20 in the service area, the master event manager 106 may generate (607) a random number from one to a number corresponding to the total quantity of service point groups in the entire service area or in a portion thereof that suffered the outage and compare (609) the random number to the group numbers stored in the ALD database 124. If a match is detected, then the master event manager 106 may send a restart message to the ALC manager 108, which in turn sends the message (611) to the active load clients 300 for all the service points within the group being restarted. Generation of random numbers, comparison of the random numbers to stored service point group numbers, and issuance of restart messages would continue (613) until all the service points 20 in the affected service area have been restarted or had their electricity restored.

Figure 7:
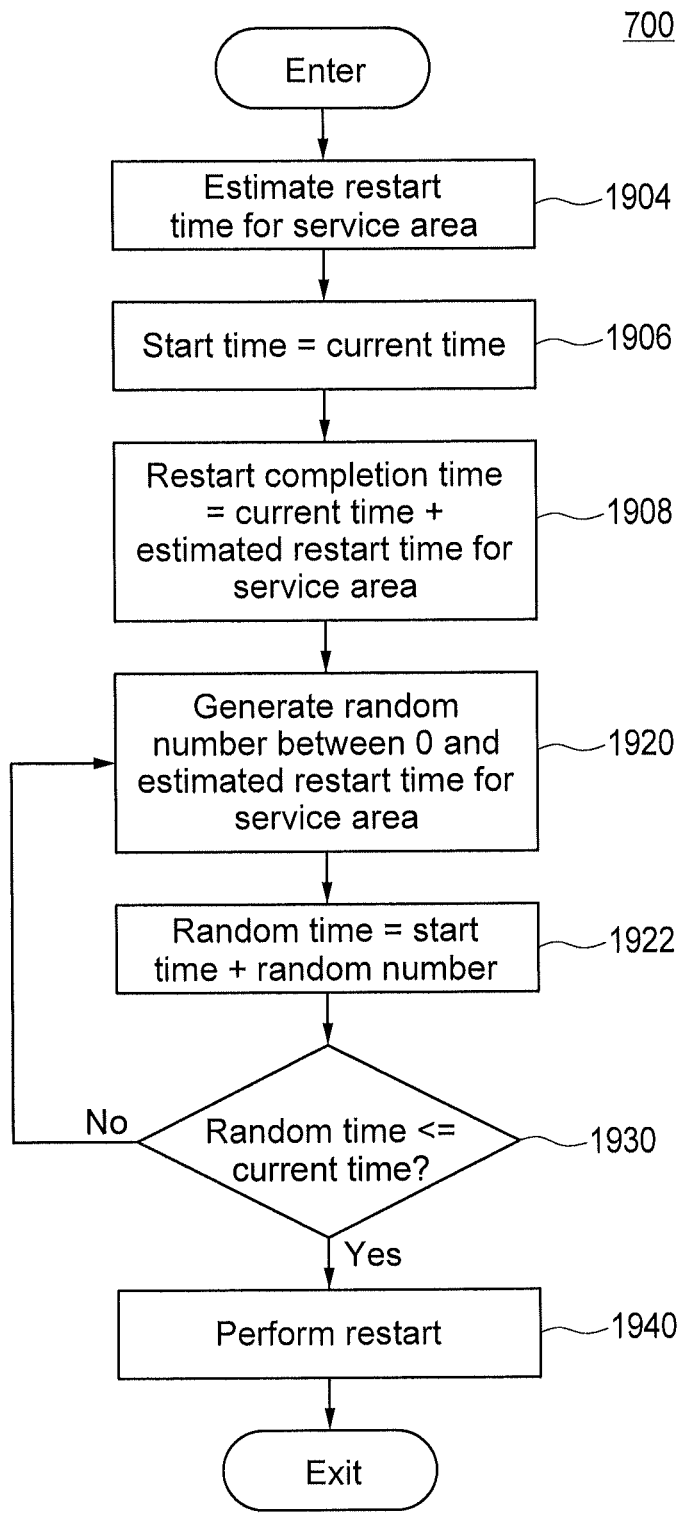
FIG. 7 is an operational flow diagram illustrating a method for an active load client to initiate a restart without specific instruction from the active load director, in accordance with a further exemplary embodiment of the present invention.

In a further embodiment, the active load client 300 may initiate a restart without the need to contact the ALD 100. In this embodiment, the event scheduler 344 or an equivalent element of each active load client 300 includes a random number generator. FIG. 7 is an operational flow diagram 700 illustrating a method for an active load client 300 to initiate a restart without specific instruction from the ALD 100, in accordance with this embodiment of the present invention. According to the logic flow of FIG. 7, the active load client 300 (e.g., via the event scheduler 344) estimates (1904) a length or duration of time (in seconds) required to restart electrical service in the entire service area and sets (1906) the start time to the current time (in seconds). The estimated length of time may be prestored in and retrieved from memory of the active load client 300 or may be otherwise determined by the event scheduler 344 (e.g., through receipt of a control message from the ALD 100, such as after the active load client 300 sends a request to restart to the ALD 100, which then queues the request and notifies the event scheduler 344 of the active load client's position in the queue). In one embodiment, the event scheduler 344 estimates (1904) the length of time required for service area restart after the active load client 300 begins receiving power from the utility. Next, the event scheduler sets (1908) the restart completion time to be the current time plus the estimated amount of time required to restart electrical service in the entire service area. Additionally, the event scheduler 344 generates (1920) a random number as a unit of time. In one embodiment, the random number is between zero and the estimated amount of time required to restart electrical service in the entire service area. The event scheduler 344 then calculates (1922) a "random start time," which is the start time plus the random number. If the event scheduler determines (1930) the random start time to be greater than the then-current time of day (i.e., later than the current time of day), then the event scheduler 344 generates (1920) another random number. Otherwise, when the random start time is no later than the current time of day, the event scheduler 344 initiates (1940) a restart of electrical service at the service point 20 by allowing electricity to flow to or through power consuming devices 30, 40, 50, 60, 70, 402-412 under the control of the active load client 300. One of ordinary skill in the art will readily recognize and appreciate that the logic flow of FIG. 7 may be performed by another processing component of the active load client 300 instead of the event scheduler 344.

To illustrate the embodiment of FIG. 7, consider the following example. After a power outage, an active load client 300 at a service point 20 (e.g., running off of a backup battery) may send a request to restart to the ALD 100. Responsive to the request, the ALD 100 notifies the active load client 300 of the approximate length of time until power is to be restored to the utility service area in which the service point 20 is located. For purposes of this example, if the estimated length of time until service restoration is six (6) hours (21,600 seconds), the active load client 300 estimates (1904) the duration of time required to restart electrical service as 21,600 seconds and sets (1906) the reset start time to the current time (in seconds). If the time at which the active load client 300 receives the notification from the ALD 100 is 10:30 AM (37,800 seconds on a 24 hour clock), the active load client sets (1904) the current time to 37,800 seconds. The active load client 300 then sets (1908) the restart completion time to be 59,400 seconds or 4:30 PM (i.e., the current time plus the estimated amount of time required to restart electrical service in the service area). Additionally, the active load client 300 generates (1920) a random number as a unit of time. For example, the random number may be 1,050 seconds, which happens to be between zero and the estimated amount of time required to restart electrical service in the entire service area (e.g., 21,600 seconds). The active load client 300 then calculates (1922) a "random start time," which is the start time plus the random number. In this example, the random start time would be 37,800 seconds (i.e., 10:30 AM) plus 1,050 seconds, or 38,850 seconds (i.e., 10:47:30 AM). The active load client 300 then compares (1930) the random start time to the current time of day. If the current time of day is at or after the random start time (e.g., 10:47:30 AM), the active load client initiates (1940) a restart of electrical service at the service point 20 by allowing electricity to flow to or through power consuming devices 30, 40, 50, 60, 70, 402-412 under the control of the active load client 300. On the other hand, if the current time of day is earlier than the random start time (e.g., current time is 10:35 AM), the active load client generates (1920) another random number, determines (1922) a new random start time, and compares (1930) the new random start time to the current time of day to determine whether electrical service can now be started at the service point 20.

Figure 8:
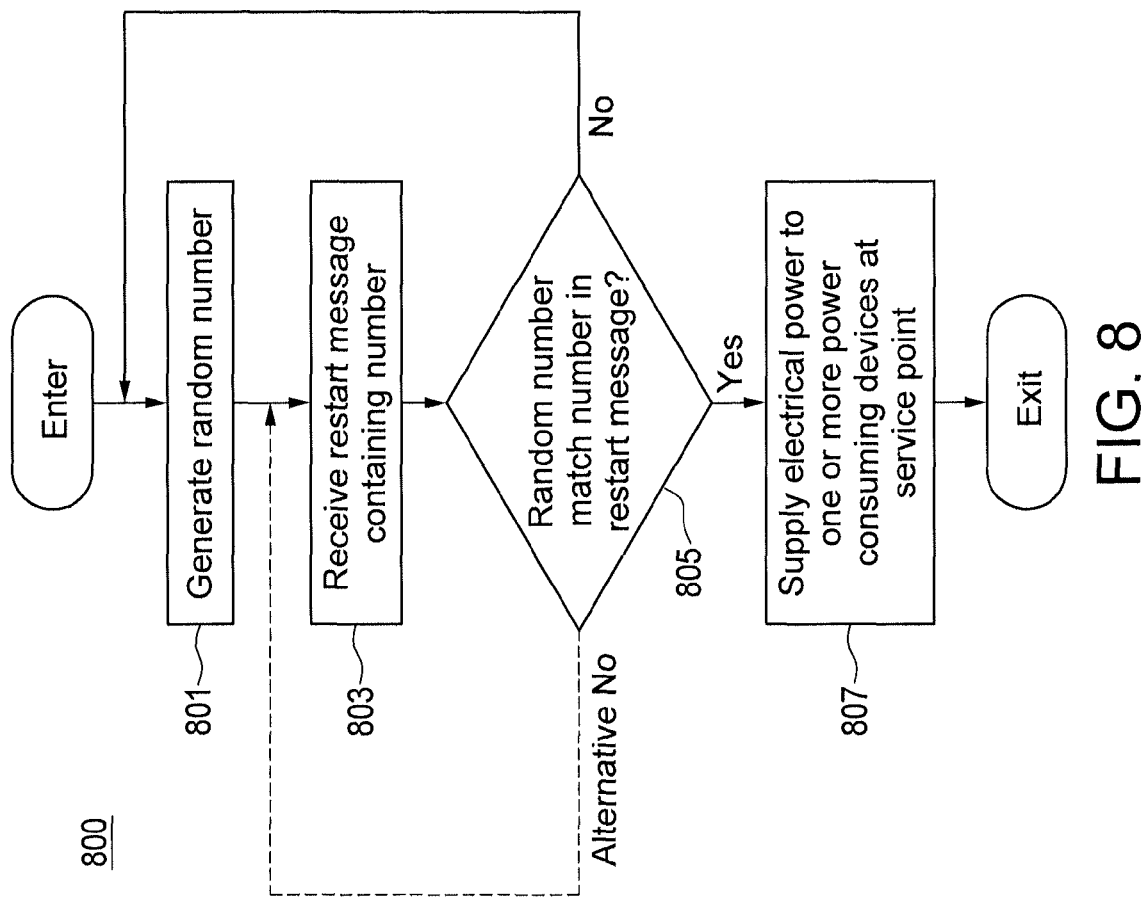
FIG. 8 is an operational flow diagram illustrating a method for a control device located at a service point to initiate a restart of electrical service at the service point with assistance of a central controller, in accordance with another exemplary embodiment of the present invention.

In a further embodiment, the ALD 100 and each active load client 300 collaborate to determine respective restart times, as illustrated in the logic flow diagram 800 of FIG. 8. For example, the master event manager 106 of the ALD 100 sequences through a predefined or predetermined set of numbers (e.g., 1 through 100) after a determination has been made that the power grid supplying power to service points 20 in a service area of the utility is functioning properly and capable of supplying power to the service area. Each active load client 300 generates (801) a random number within the same predefined set of numbers. As the ALD 100 sequences through the set of numbers, it transmits a restart message that includes the current number to all the active load clients 300 at service points 20 within the utility service area. Upon receiving (803) the restart message, the active load client compares (805) the number in the restart message to the random number generated by the active load client 300. If the active load client's own randomly picked number is the same as the number currently being transmitted by the ALD 100, then the active load client 300 does a restart and supplies (807) electrical power to the power consuming devices under the active load client's control. Otherwise, the active load client 300 generates (801) another random number, or maintains the random number selected previously if it is greater than the number received from the ALD 100 (as shown in the "Alternative No" path of FIG. 8), and awaits the next number from the ALD 100. If the new number received from the ALD 100 matches the newly generated random number (or the previously generated random number where such number has been maintained), the active load client 300 does a restart and supplies (807) electrical power to the power consuming devices under the active load client's control.

Figure 9:
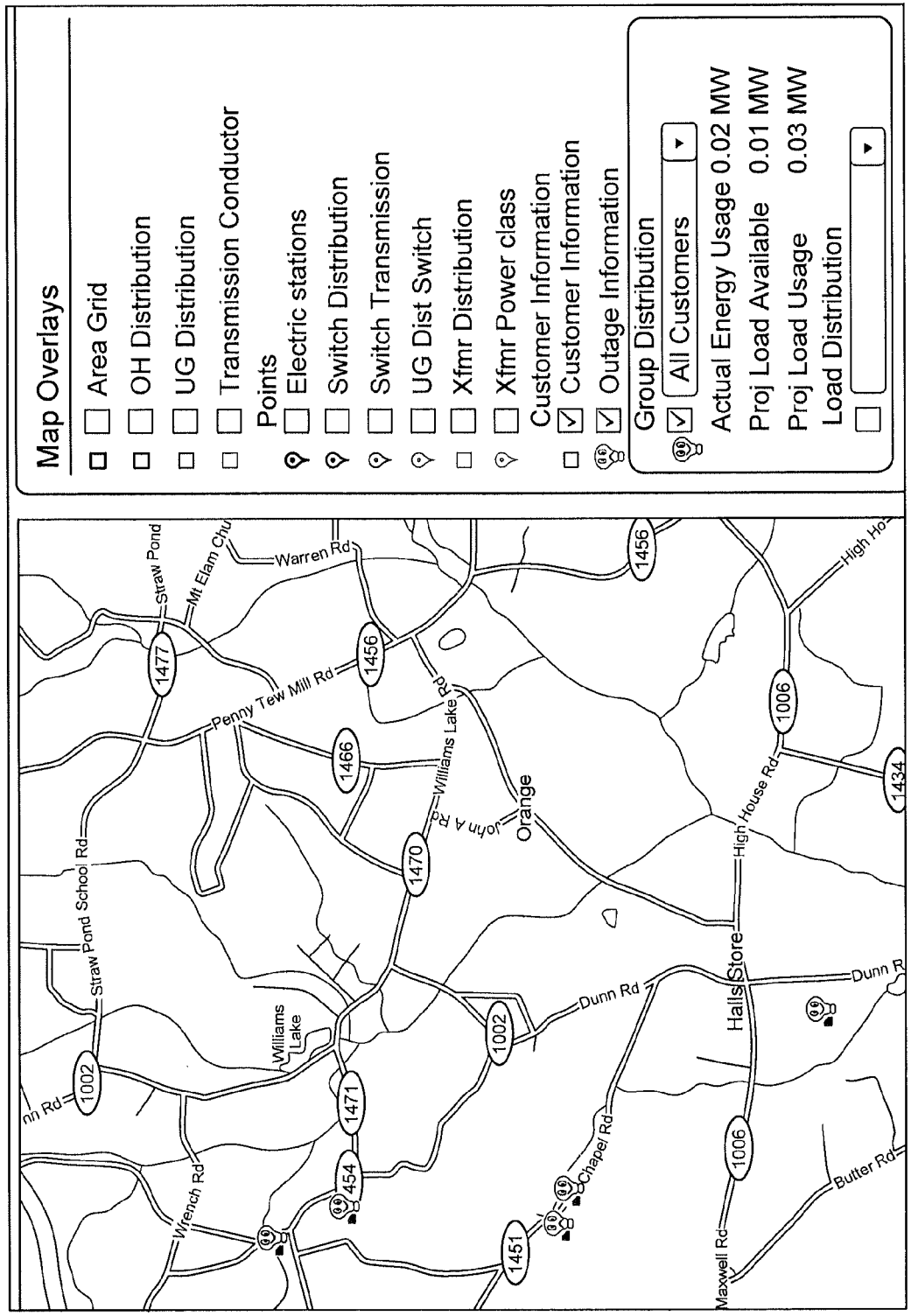
FIG. 9 is a screen shot of an exemplary computer display through which a utility operator may view outages within a service area, in accordance with a further embodiment of the present invention.

According to yet another embodiment of the present invention, a utility operator may manually monitor the power availability status for each individual service point 20 or for groups of service points and restore power to them in an orderly fashion after an outage so as to reduce or eliminate transients, voltage and current spikes, and other harmful byproducts of a "cold" restart. In this embodiment, the utility operator may utilize geographic information system (GIS) maps stored within the ALD 100 together with diagnostic and monitoring software to display, among other things, outages in the utility's service area. A screen shot of an exemplary computer display through which a utility operator may view power outages within a utility service area is shown in FIG. 9. The outage information displayed on the screen is generated by a computer program (e.g., the diagnostic and monitoring software) running in the ALD 100 or the utility control center 200. The computer program determines power outages based on information received or not received from the active load clients 300 (e.g., via the ALD 100, as applicable) within the utility's service area during predetermined intervals (e.g., at least once every five minutes) or in response to polling queries transmitted by the ALD 100, as detailed in U.S. Pat. No. 7,715,951. For example, some or all of the active load clients 300 may include backup batteries that allow them to continue transmitting power consumption or other status data when power has been lost to the service area containing the active load clients 300. Alternatively, when a backup battery is not employed, an active load client 300 will not transmit its status data during the predetermined interval or in response to a poll (e.g., a Read Meter command) from the ALD 100. Such a failure to respond may be construed as an indication that power remains out to the service point 20 at which the particular active load client 300 is located, especially where other information obtained by the ALD 100 and/or the utility control center 200 indicates that a power outage has occurred. By determining the locations of power outages through communications, or a lack thereof, between an ALD 100 and its associated active load clients 300, and viewing such outages on a display screen, operators of an electric utility may control the restart of power of those service points 20 that have been affected by the outage in such a way as to minimize the likelihood of a power spike that could either damage the utility's infrastructure or require use of the utility's operating reserve.

Figure 10:
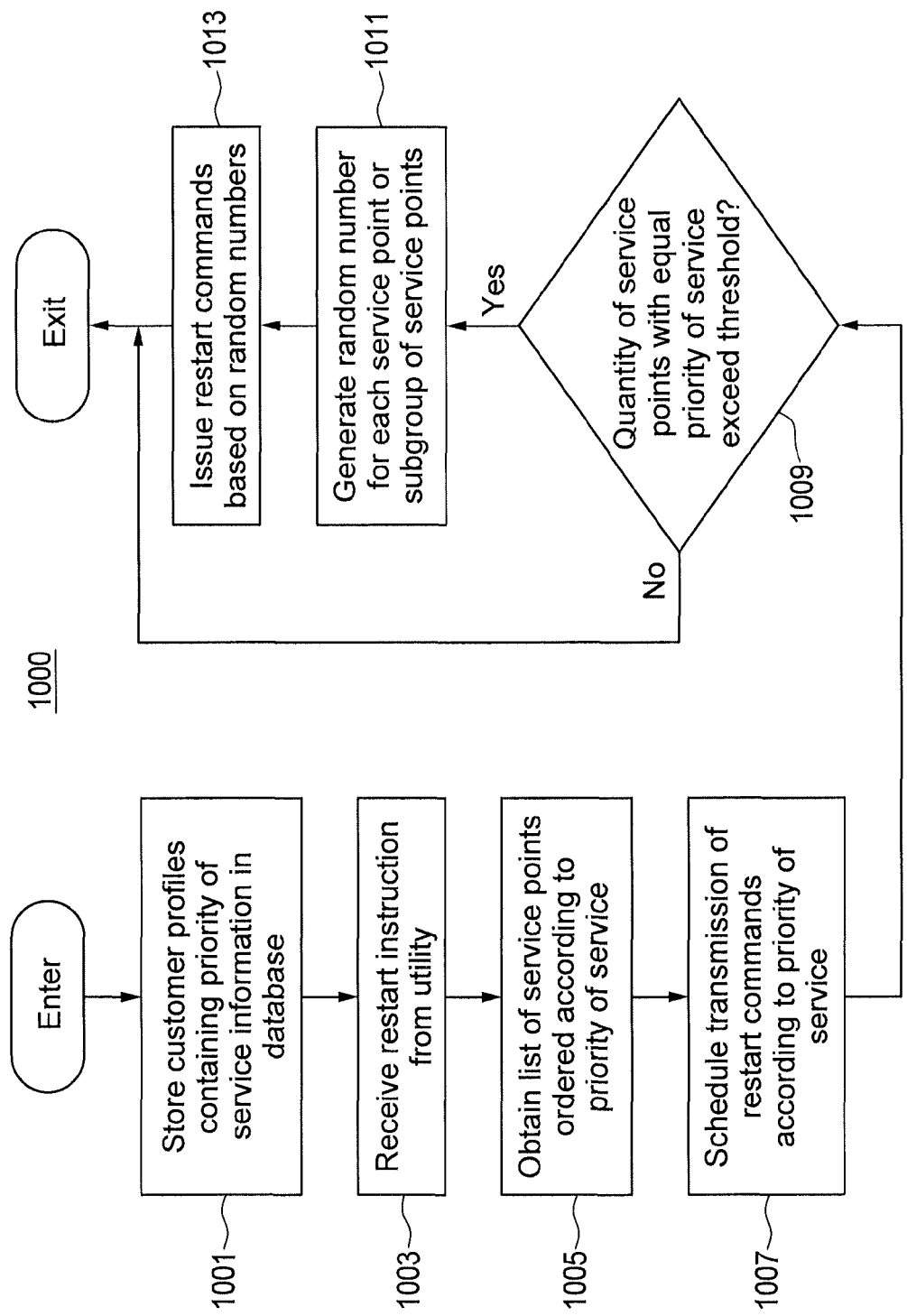
FIG. 10 is an operational flow diagram illustrating a method for a central controller to initiate a restart of electrical service to service points in a utility service area based on customer profiles, in accordance with yet another exemplary embodiment of the present invention.

Another embodiment of the present invention builds upon the use of customer profiles as detailed in U.S. Patent Application Publication No. US 2010/0145534 A1. According to this embodiment, which is illustrated in the logic flow diagram 1000 of FIG. 10, the ALD 100 maintains (1001) a connection/disconnection profile as part of the customer's overall customer profile. The connection/disconnection profile contains information about devices within the service point that should receive limited or no control events, information about other devices (such as health-related or medical devices) that may adversely affect the customer in the event of a disconnect, priority of service, and other connect/disconnect information about the customer. The priority of service within the profile is used as a guide to determine the priority of a restart. In FIG. 4, the connection/disconnection profile may be part of the customer personal settings 138, which may be stored in the ALD database 124.

In this embodiment, the utility initiates a controlled restart instructing (1003) the ALD 100 to restart electrical service to the service points 20 according to a prioritized order based on priority of service. Thus, in this case, the utility operator or a service restart/restore software program executed by the ALD 100 consults the ALD database 124 and obtains (1005) a list of all service points, preferably ordered or organized by their priorities of service. Then, the master event manager 106 of the ALD 100 schedules (1007) transmission of restart commands to the active load clients 300 for the service points 20 based on the priorities of service. For example, the service points 20 with the highest priority of service are scheduled to receive restart commands first, the service points 20 with the second highest priority of service are scheduled to receive restart commands second, and so forth. In such a manner, restart events are scheduled within the master event manager 106 relative to each service point's priority of service. In the event that the quantity of service points with equal priority of service exceeds a predetermined threshold (1009) (e.g., a quantity that would likely cause an undesirable power spike or require use of utility operating reserve), the ALD 100 may determine or generate (1011) random numbers for each service point in this group or for subgroups within the group and issue restart commands based on the random numbers. For example, as discussed above, numbers may be randomly generated between one and the quantity of service points or subgroups that have equal priorities of services. The numbers would be assigned to the service points or subgroups and the ALD 100 or other central controller would issue (1013) restart commands to the service points or subgroups based on their randomly assigned numbers. The restart commands may be separated in time by a predetermined delay (e.g., 5 minutes) to provide adequate time for the service points or subgroups to startup and reach steady state operation.

In yet another embodiment, the utility may restore power to service points within a group, as defined by the utility. According to this embodiment, the ALD 100 may logically divide the service points 20 into groups based on one or more common characteristics, such as by geography (e.g., geographic location), power consumption (e.g., average hourly, daily or monthly power consumption), type of business operated at the service point, or some other characteristic. Those of ordinary skill in the art will readily recognize and appreciate that priority of service may also be considered a characteristic of a service point 20. In this embodiment, the utility uses the ALD database 124 to obtain a list of groups. The utility then uses characteristics of each group (such as geography) to schedule and prioritize restarts for service points 20 within each group.

Figure 11:
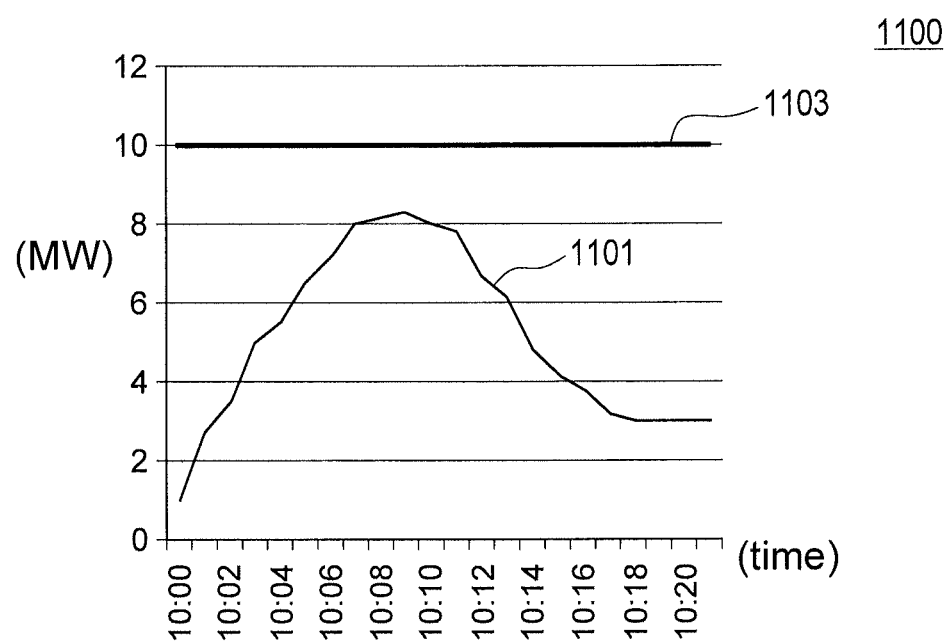
FIG. 11 is an exemplary graph showing how energy demand may rise during a controlled restart in accordance with one embodiment of the present invention.

FIG. 11 is an exemplary graph 1100 illustrating power demand (in megawatts (MW)) versus time during a power restoration period using a controlled restart in accordance with the present invention. As illustrated in the graph 1100, the controlled restoration of power to the service points in a utility's service area eliminates the momentary power surge or spike shown in FIG. 1 and smoothens out the power versus time curve 1101 during the restart period, thereby keeping the maximum power consumed below the acceptable peak level 1103. Thus, controlled restart eliminates or at least substantially mitigates the cold start transients that can cause damage to the electrical grid, as well as to power consuming devices connected thereto.

As described above, the present invention encompasses an apparatus and method for effecting controlled restart of service points after a service outage. With this invention, power spikes resulting from cold restarts are mitigated so as to maintain stability in the utility's power grid, as well as to reduce the risk of infrastructure damage. Additionally, the controlled restart produced by the present invention enables power restoration without resort to using utility operating reserve.

In the foregoing specification, the present invention has been described with reference to specific embodiments. However, one of ordinary skill in the art will appreciate that various modifications and changes may be made without departing from the spirit and scope of the present invention as set forth in the appended claims. For example, random number generation may be performed by the utility control center 200 and random numbers may be subsequently communicated to the ALD 100. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A method for restarting electrical service at a service point in a utility service area after a power stoppage, the method comprising:
   determining a random number associated with the service point;
   determining a time at which to restart electrical service at the service point based at least on the random number; and
   supplying electrical power to at least one power consuming device located at the service point at the determined service point restart time.

2. The method of claim 1, wherein a supply of electrical power to the at least one power consuming device is controlled by a control device located at the service point and wherein the step of determining a random number comprises:
   determining, by the control device, the random number associated with the service point.

3. The method of claim 2, wherein the step of determining a random number comprises:
   receiving, by the control device, the random number from a central controller located remotely from the service point.

4. The method of claim 2, further comprising:
   receiving, by the control device, a number from a central controller located remotely from the service point;
   wherein the step of determining a time at which to restart electrical service at the service point includes:
   comparing the received number to the random number; and
   determining the time at which to restart electrical service at the service point when the received number matches the random number.

5. The method of claim 2, further comprising:
   estimating an amount of time required to complete a restart of electrical service in the utility service area;
   determining a start time for commencing the restart of electrical service in the utility service area; and
   estimating a completion time for completing the restart of electrical service in the utility service area based on the estimated amount of time required to complete the restart of electrical service in the utility service area and the start time for commencing the restart of electrical service in the utility service area;
   wherein the time at which to restart electrical service at the service point is determined based on the random number and the start time for commencing the restart of electrical service in the utility service area, wherein the random number is between zero and the estimated completion time, and wherein electrical power is supplied to the at least one power consuming device at a current time of day in the event that the determined service point restart time is no later than the current time of day.

6. The method of claim 2, wherein supplying electrical power to the at least one power consuming device comprises:
   communicating at least one power control command to at least one controllable device that controls a flow of electrical power to the at least one power consuming device, the at least one power control command instructing the at least one controllable device to enable a flow of electrical power to the at least one power consuming device.

7. The method of claim 1, wherein a supply of electrical power to the at least one power consuming device is controlled by a control device located at the service point, wherein the control device receives control messages from a central controller that is located remote from the service point and that interfaces between an electric utility and a plurality of service points, wherein the random number is determined by the central controller, and wherein the method further comprises:
   determining, by the central controller, a customer profile associated with the service point;
   wherein the step of determining a time at which to restart electrical service at the service point includes:
   determining, by the central controller, a time at which to restart electrical service at the service point based at least on the random number and the customer profile.

8. The method of claim 7, wherein the customer profile includes an indication of a priority of service for the service point.

9. The method of claim 1, wherein a supply of electrical power to the at least one power consuming device is controlled by a control device located at the service point, wherein the control device receives power control messages from a central controller that is located remotely from the service point and that interfaces between an electric utility and a plurality of service points, wherein the random number is determined by the central controller, and wherein the method further comprises:
   determining, by the central controller, a characteristic of the service point;
   wherein the step of determining a time at which to restart electrical service at the service point includes:
   determining, by the central controller, a time at which to restart electrical service at the service point based at least on the random number and the characteristic.

10. The method of claim 9, wherein the characteristic includes a geographic location of the service point.

11. The method of claim 1, wherein the random number is associated with a group of service points, wherein the group includes only a portion of a plurality of service points in the utility service area, and wherein the service point is included in the group.

12. The method of claim 1, wherein a supply of electrical power to the at least one power consuming device is controlled by a control device located at the service point and wherein the step of determining a time at which to restart electrical service at the service point comprises:

receiving, by the control device, a control message from a central controller located remotely from the service point; and determining, by the control device, the time at which to restart electrical service at the service point based on the control message.

13. A method for a control device to restart electrical service at a service point in a utility service area after a power stoppage, the control device being installed at the service point and controlling a supply of electrical power to at least one power consuming device located at the service point, the method comprising:

estimating an amount of time required to complete a restart of electrical service in the utility service area;

determining a start time for commencing the restart of electrical service in the utility service area;

estimating a completion time for completing the restart of electrical service in the utility service area based on the estimated amount of time required to complete the restart of electrical service in the utility service area and the start time for commencing the restart of electrical service in the utility service area;

generating a random number, wherein the random number is between zero and the estimated completion time;

determining a random start time for restarting electrical service at the service point based on the random number and the start time for commencing the restart of electrical service in the utility service area;

comparing the random start time to a current time of day; and restarting electrical service at the service point at the current time of day in the event that the random start time is no later than the current time of day.

14. The method of claim 13, further comprising:

generating another random number in the event that the random start time is later than the current time of day;

determining a new random start time for restarting electrical service at the service point based on the other random number and the start time;

comparing the new random start time to the current time of day; and restarting electrical service at the service point at the new random start time in the event that the new random start time is no later than the current time of day.

15. A method for a central controller to restart electrical service at a plurality of service points in a utility service area after a power stoppage, the central controller being located remotely from the plurality of service points, each service point of the plurality of service points including a control device, each control device controlling a supply of electrical power to at least one power consuming device located at a corresponding service point, the method comprising:

associating a number with at least one service point of the plurality of service points, wherein a quantity of the at least one service point is less than a quantity of the plurality of service points;

generating a random number;

comparing the random number to the number associated with the at least one service point; and communicating a restart message to at least one control device installed at the at least one service point in the event that the random number matches the number associated with the at least one service point and the at least one service point has not yet had electrical service restarted.

16. The method of claim 15, wherein the at least one service point is a group of service points and wherein the step of transmitting comprises:

communicating the restart message to control devices for all service points in the group.

17. The method of claim 15, wherein the central controller is an active load director, wherein the at least one control device is at least one active load client, and wherein the number associated with the at least one service point is between one and the quantity of the plurality of service points.

18. A method for restarting electrical service at a plurality of service points in a utility service area after a power stoppage, each service point of the plurality of service points including a control device of a plurality of control devices, each control device controlling a supply of electrical power to one or more power consuming devices located at a corresponding service point, the method comprising:

selecting, by a central controller located remotely from the plurality of service points, a number within a predetermined set of numbers;

transmitting, by the central controller, a control message to the plurality of control devices, the control message including the selected number;

generating, by each control device of the plurality of control devices, a respective random number within the predetermined set of numbers;

comparing, by each control device of the plurality of control devices, the selected number to the respectively generated random number; and supplying, by a particular control device of the plurality of control devices, electrical power to at least one power consuming device when the random number generated by the particular control device matches the selected number.

19. The method of claim 18, wherein supplying electrical power to the at least one power consuming device comprises:

communicating, by the particular control device, at least one power control command to at least one controllable device that controls a flow of electrical power to the at least one power consuming device, the at least one power control command instructing the at least one controllable device to enable a flow of electrical power to the at least one power consuming device.

20. A method for a control device to restart electrical service at a service point in a utility service area after a power stoppage, the control device being installed at the service point and controlling a supply of electrical power to at least one power consuming device located at the service point, the method comprising:

generating a random number within a predetermined set of numbers;

receiving a control message from a central controller located remotely from the service point, the control message including a number within the predetermined set of numbers;

comparing the number in the control message to the random number; and supplying electrical power to the at least one power consuming device when the random number matches the number in the control message.

21. The method of claim 20, further comprising:
generating a new random number in the event that the number in the control message does not match the random number;
receiving a new control message from the central controller, the new control message including another number within the predetermined set of numbers;
comparing the number in the new control message to the new random number; and
supplying electrical power to the at least one power consuming device when the new random number matches the number in the new control message.

22. The method of claim 20, further comprising:
receiving a new control message from the central controller, the new control message including another number within the predetermined set of numbers;
comparing the number in the new control message to the random number in the event that the random number was greater than a number in a prior control message; and
supplying electrical power to the at least one power consuming device when the random number matches the number in the new control message.

23. The method of claim 20, wherein supplying electrical power to the at least one power consuming device comprises:
communicating at least one power control command to at least one controllable device that controls a flow of electrical power to the at least one power consuming device, the at least one power control command instructing the at least one controllable device to enable a flow of electrical power to the at least one power consuming device.

24. A method for a central controller to restart electrical service at a plurality of service points in a utility service area after a power stoppage, the central controller being located remotely from the plurality of service points, each service point of the plurality of service points including a control device, each control device controlling a supply of electrical power to at least one power consuming device located at a corresponding service point, the method comprising:
determining priorities of service for the plurality of service points based on respective customer profiles associated with the plurality of service points;
determining a prioritized order for restarting electrical service to the plurality of service points based on the priorities of service; and
transmitting a restart command to at least one control device in the event that a priority of service for at least one service point at which the at least one control device is installed matches a priority of service for which electrical service is being restarted according to the prioritized order.

25. The method of claim 24, wherein the at least one service point is a group of service points, the method further comprising:
generating a random number for each service point in the group of service points; and
transmitting the restart command to a particular service point of the group of service points based on the random number for the particular service point.

26. The method of claim 24, wherein the at least one service point is a group of service points, the method further comprising:
generating a random number for each service point in the group of service points;
transmitting a first restart command to a first service point of the group of service points based on the random number for the first service point; and
transmitting a second restart command to a second service point of the group of service points based on the random number for the second service point, wherein the second restart command is separated in time from the first restart command by a predetermined delay sufficient to allow the first service point to startup and reach steady state operation.

27. A method for a central controller to restart electrical service at a plurality of service points in a utility service area after a power stoppage, the central controller being located remotely from the plurality of service points, each service point of the plurality of service points including a control device, each control device controlling a supply of electrical power to at least one power consuming device located at a corresponding service point, the method comprising:
logically dividing the plurality of service points into a plurality of groups based on service point characteristics, wherein service points within a particular group share at least one common service point characteristic;
determining a prioritized order for restarting electrical service to the plurality of service points based on service point characteristics;
selecting a group of service points from the plurality of groups based on the prioritized order and at least one common service point characteristic for the group; and
transmitting a restart command to a group of control devices installed at the selected group of service points.

28. The method of claim 27, wherein service point characteristics include at least one of geographic location and power consumption.

29. A central controller for use in an active load management system that includes a plurality of client devices installed at a plurality of service points located in a service area of a utility, the plurality of service points being located remotely from the central controller, the central controller comprising:
a database operable to associate a plurality of numbers with the plurality of service points;
an event manager operably coupled to the database and operable to:
determine whether electrical service can be restored to the plurality of service points after a power stoppage has occurred;
generate a random number responsive to a determination that electrical service can be restored;
compare the random number to each of the plurality of numbers; and
generate a restart message when the random number matches a number of the plurality of numbers; and
a client device manager operably coupled to the event manager and operable to transmit the restart message to at least one client device installed at one or more service points of the plurality of service points, the one or more service points being associated with the number that matched the random number.

30. A control device for use in an active load management system that includes a central controller located remotely from the control device, the control device being installed at a service point located in a service area of a utility and providing power control commands to one or more controllable devices which control a flow of electric power to one or more power consuming devices located at the service point, the control device comprising:
a communications interface operable to receive control messages from the central controller;
a processor operably coupled to the communications interface, the processor operable to:

determine a time at which a control message is received, wherein the control message includes an estimated length of time for power to be restored to the utility service area;

determine a restart completion time as the time at which the control message was received plus the estimated length of time for power to be restored to the utility service area;

generate a random number as a unit of time;

determine a random start time as the time at which the control message was received plus the random number;

compare the random start time to a current time of day; and generate a power control command to initiate a restart of electrical service to the one or more power consuming devices when the random start time is no later than the current time of day; and at least one controllable device interface operably coupled to the processor, the at least one controllable device interface facilitating communication of the power control command to the one or more controllable devices so as to effectuate the restart of electrical service to the one or more power consuming devices.

31. An active load management system operable to controllably restart electrical service to a plurality of service points in a service area of an electrical utility after a power stoppage, the active load management system comprising:

a central controller that includes:

a database operable to associate a plurality of numbers with the plurality of service points;

an event manager operably coupled to the database and operable to:

determine whether electrical power can be restored to the plurality of service points after a power stoppage has occurred;

generate a random number responsive to a determination that electrical power can be restored;

compare the random number to each of the plurality of numbers; and generate a restart control message when the random number matches a number of the plurality of numbers; and a client device manager operably coupled to the event manager and operable to transmit the restart control message to at least one client device installed at one or more service points of the plurality of service points, the one or more service points being associated with the number that matched the random number; and a plurality of client devices located remotely from the central controller and installed at the plurality of service points, each client device including:

a communications interface operable to receive control messages from the central controller;

a processor operably coupled to the communications interface, the processor operable to generate a power control command responsive to receipt of a restart control message to initiate a restart of electrical service to a service point at which the client device is installed; and at least one controllable device interface operably coupled to the processor, the at least one controllable device interface facilitating communication of the power control command to one or more controllable devices at the service point so as to effectuate the restart of electrical service at the service point.

* * * * *

UNITED STATES PATENT AND TRADEMARK OFFICE
CERTIFICATE OF CORRECTION

Page 1 of 1

PATENT NO.        : 8,527,107 B2
APPLICATION NO.   : 12/896307
DATED             : September 3, 2013
INVENTOR(S)       : Joseph W. Forbes, Jr. and Joel L. Webb It is certified that error appears in the above-identified patent and that said Letters Patent is hereby corrected as shown below:

Title page, item (54) and in the Specification, column 1, line 3, Title delete "SERVCIE WITH" and insert --SERVICE WITHIN--.

Signed and Sealed this
Tenth Day of December, 2013

Margaret A. Focarino
*Commissioner for Patents of the United States Patent and Trademark Office*